(12) United States Patent
Kamei et al.

(10) Patent No.: US 10,190,941 B2
(45) Date of Patent: Jan. 29, 2019

(54) SILICON OPTICAL CIRCUIT FOR FLAW DETECTION IN AN OPTICAL CIRCUIT ELEMENT

(71) Applicant: NIPPON TELEGRAPH AND TELEPHONE CORPORATION, Tokyo (JP)

(72) Inventors: Shin Kamei, Atsugi (JP); Makoto Jizodo, Atsugi (JP); Kotaro Takeda, Atsugi (JP); Hiroshi Fukuda, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/776,027

(22) PCT Filed: Nov. 17, 2016

(86) PCT No.: PCT/JP2016/004913
§ 371 (c)(1),
(2) Date: May 14, 2018

(87) PCT Pub. No.: WO2017/085934
PCT Pub. Date: May 26, 2017

(65) Prior Publication Data
US 2018/0335365 A1 Nov. 22, 2018

(30) Foreign Application Priority Data

Nov. 19, 2015 (JP) .................................. 2015-226811

(51) Int. Cl.
*G01M 11/00* (2006.01)
*G02B 6/124* (2006.01)
(Continued)

(52) U.S. Cl.
CPC ............. *G01M 11/33* (2013.01); *G02B 6/124* (2013.01); *G02B 6/12007* (2013.01);
(Continued)

(58) Field of Classification Search
CPC .. G01M 11/33; G02B 6/12007; G02B 6/1228; G02B 6/124; G02B 2006/12061;
(Continued)

(56) References Cited

U.S. PATENT DOCUMENTS 9,715,064 B1 * 7/2017 Gambino ................ G02B 6/124
9,759,861 B2 * 9/2017 Zhang .................... G02B 6/136
(Continued)

FOREIGN PATENT DOCUMENTS

JP H08-210946 A 8/1996
JP H10-227934 A 8/1998
(Continued)

OTHER PUBLICATIONS

Wim Bogaerts et al., *Silicon-on-Insulator Spectral Filters Fabricated with CMOS Technology*, IEEE Journal of Selected Topics in Quantum Electronics, vol. 16, No. 1, Jan./Feb. 2010, pp. 33-44.
(Continued)

*Primary Examiner* — Andrew Jordan
(74) *Attorney, Agent, or Firm* — Workman Nydegger

(57) ABSTRACT

The visual detection of a silicon optical circuit in a conventional technique depends on sensory decision by a human who visually conducts checking, and there has been limitation in completely detecting small flaws. The optical circuit of the present invention includes, in addition to an optical circuit that implements desired functions, an optical waveguide for flaw detection which surrounds the entire optical circuit and which is sufficiently proximate to the optical waveguide of the optical circuit and grating couplers connected to the optical waveguide for detection. Based on the
(Continued)

transmission characteristic measurement of the optical waveguide for detection using the grating couplers, a flaw within each chip can be efficiently discovered in the state of a wafer before being cut into chips. A flaw can also be discovered hierarchically by providing individual optical waveguides for detection for respective chips and by further forming one common optical waveguide for detection over the plurality of chips.

9 Claims, 32 Drawing Sheets

(51) Int. Cl.
  *G02B 6/122* (2006.01)
  *G02B 6/12* (2006.01)

(52) U.S. Cl.
  CPC .. *G02B 6/1228* (2013.01); *G02B 2006/12061* (2013.01); *G02B 2006/12107* (2013.01); *G02B 2006/12138* (2013.01); *G02B 2006/12147* (2013.01); *G02B 2006/12164* (2013.01)

(58) Field of Classification Search
  CPC ........... G02B 2006/12147; G02B 2006/12164; G02B 2006/12107; G02B 2006/12138
  See application file for complete search history.

(56) References Cited

U.S. PATENT DOCUMENTS

| | | | | |
|---|---|---|---|---|
| 9,778,420 B2* | 10/2017 | Shimizu | ................... | G02B 6/34 |
| 9,817,186 B2* | 11/2017 | Kamei | ................... | G02B 6/126 |
| 9,933,577 B2* | 4/2018 | Gambino | ................ | G02B 6/34 |
| 2015/0211960 A1 | 7/2015 | Shimizu | | |
| 2017/0068048 A1* | 3/2017 | Kamei | ................... | G02B 6/126 |
| 2018/0010906 A1* | 1/2018 | Tokushima | ............ | G01B 11/14 |

FOREIGN PATENT DOCUMENTS

| | | |
|---|---|---|
| JP | 2008-134211 A | 6/2008 |
| JP | 2011-107384 A | 6/2011 |
| WO | 2014/034655 A1 | 3/2014 |

OTHER PUBLICATIONS

Seok-Hwan Jeong et al., *Si-nanowire-based Multistage Delayed Mach-Zehnder Interferometer Optical MUX/DeMUX Fabricated by an ArF-immersion Lithography Process on a 300 mm SOI Wafer*, Optics Letters, vol. 39, No. 13, Jul. 1, 2014, pp. 3702-3705.

Shijun Xiao et al., *Multiple-Channel Silicon Micro-Resonator Based Filters for WDM Applications*, Optics Express, vol. 15, No. 12, Jun. 11, 2007, pp. 7489-7498.

Wim Bogaerts et al., *Low-Loss, Low-Cross-Talk Crossing for Silicon-on-Insulator Nanophotonic Waveguides*, Optics Letters, vol. 32, No. 19, Oct. 1, 2007, pp. 2801-2803.

International Search Report dated Feb. 21, 2017, issued in PCT Application No. PCT/JP2016/004913, filed Nov. 17, 2016.

International Preliminary Report on Patentability dated May 31, 2018, issued in PCT Application No. PCT/JP2016/004913, filed Nov. 17, 2016.

* cited by examiner

SILICON OPTICAL CIRCUIT FOR FLAW DETECTION IN AN OPTICAL CIRCUIT ELEMENT

TECHNICAL FIELD

The present invention relates to a silicon optical circuit formed with a silicon optical waveguide, and, more particularly, to the silicon optical circuit for detecting a flaw occurred on the waveguide at a wafer state.

BACKGROUND ART

Recently, vigorous research and development of a silicon photonics technique capable of drastically downsizing optical circuits are underway by applying a manufacturing technique of silicon integrated electronic circuits to the formation of optical waveguides and the like. Circuits having various functions are proposed as silicon optical circuits based on the silicon photonics technique, and development for their practical use is particularly conducted in the field of an optical transceiver.

FIG. 27A and FIG. 27B are diagrams each showing a typical configuration of an optical modulation circuit as a first example of a silicon optical circuit of a conventional technique. Each of optical circuits 9100-1 and 9100-2 in FIG. 27A and FIG. 27B is an optical modulation circuit chip of a digital coherent polarization multiplexed system which is applied to an optical transceiver mainly for long distance transmission. Both of the optical circuits include the same elements, which include an input waveguide 9101, optical splitters 9102 to 9108, optical phase modulation waveguides 9109 to 9112 configuring four Mach-Zehnder circuits, optical couplers 9113 to 9118, a polarization rotation circuit 9119, a polarization combining circuit 9120, and an output waveguide 9121.

The optical circuit 9100-1 of FIG. 27A is an example in which the input/output waveguides 9101, 9121 are arranged in the vicinity of two corners at a diagonal position of the chip such that the optical input/output are positioned at the both ends of the rectangular chip. The optical circuit 9100-2 of FIG. 27B is an example in which the input/output waveguides 9101, 9121 are arranged in the vicinity of the same corner such that the optical input/output are positioned at one end of the rectangular chip.

Although not explicitly illustrated in FIG. 27A and FIG. 27B, high frequency electrodes are formed on the upper part of each of the optical phase modulation waveguides 9109 to 9112 and are operated such that an electric signal is converted into an optical phase change (phase modulation signal) due to interaction between electricity and light. Light input from the input waveguide 9101 is sequentially branched by the optical splitters 9102 to 9108, and modulation is gained at the optical phase modulation waveguides 9109 to 9112. Further, modulated lights are merged by the optical couplers 9113 to 9118, the polarization rotation circuit 9119, and the polarization combining circuit 9120, and the resultant light is output from the optical output waveguide 9121 as a polarization-multiplexed optical modulation signal.

FIG. 28 is a diagram showing a configuration of an optical circuit in which an optical modulation circuit and an optical reception circuit are integrated as a second example of a silicon optical circuit of a conventional technique. An optical circuit chip 9200 is an optical circuit chip in which the optical modulation circuit of a digital coherent polarization multiplexed system and the optical reception circuit are integrated on a silicon substrate. The silicon optical circuit is excellent in that it has good integration properties and can suppress the size and cost of a circuit by integrating a plurality of functional circuits into one chip.

An optical modulator part located at the upper side of the integrated optical circuit 9200 of FIG. 28 has a configuration identical to that of FIG. 27B. The function and operation of respective circuit elements 9201 to 9221 are identical to those of the circuit elements 9101 to 9121 as illustrated in FIG. 27B. The optical reception circuit located at the lower side of the optical circuit chip 9200 is composed of a locally generated light input waveguide 9222, a signal light input waveguide 9223, an optical splitter 9224, a polarization separation circuit 9225, a polarization rotation circuit 9226, coherent optical mixers 9227, 9228 which are optical modulation circuits, and photo detectors (PD) 9229.

A polarization multiplex signal is input into the signal light input waveguide 9223 from a transmission path, and the polarization multiplex signal is separated by the polarization separation circuit 9225 into TE polarized light and TM polarized light components. Further, from a locally generated light source, continuous light of the TE polarized light is input from the input waveguide 9222 and branched into two by the optical splitter 9224. The TE polarized light component of a signal separated by the polarization separation circuit 9225 and a locally generated light of the TE polarized light, which is one of the branched light, are modulated by the coherent optical mixer 9227. Also, the TM polarized light component of a signal separated by the polarization separation circuit 9225 is converted into the TE polarized light by the polarization rotation circuit 9226, and is input to the coherent optical mixer 9228 together with a locally generated light of the TE polarized light, which is the other one of the branched light, for modulation. Thus modulated optical signals are converted into received electrical signals by the plurality of photo detectors 9229 and are output therefrom.

CITATION LIST

Non Patent Literature

NPL 1: W Bogaerts et al, "Silicon-on-Insulator Spectral Filters Fabricated With CMOS Technology," IEEE JOURNAL OF SELECTED TOPICS IN QUANTUM ELECTRONICS, Vol. 16, pp. 33-44, 2010

NPL 2: S Jeong et al, "Si-nanowire-based multistage delayed Mach-Zehnder interferometer optical MUX/DeMUX fabricated by an ArF-immersion lithography process on a 300 mm SOI wafer," OPTICS LETTERS, Vol. 39, pp. 3702-3705, 2014

NPL 3: S Xiao et al, "Multiple-channel silicon microresonator based filters for WDM applications," OPTICS EXPRESS, Vol. 15, pp. 7489-7498, 2007

NPL 4: W Bogaerts et al, "Low-loss, low-cross-talk crossings for silicon-on-insulator nanophotonic waveguides," OPTICS LETTERS, Vol. 32, pp. 2801-2803, 2007

SUMMARY OF INVENTION

Technical Problem

As described above, although the silicon optical circuit is ready to be put into a practical use, there have been the following problems in its manufacturing and inspection processes. In the manufacturing and inspection processes of the optical circuit on a silicon wafer, defects occur on the optical waveguide at a certain probability. When moving a wafer from one of the manufacturing processes to another using tweezers or the like, there may be a case of touching the surface of the wafer by mistake. Also, if excessive stress is applied, even in a slight level, to a core being exposed on the wafer during a machining process, a scratch or physical damage may possibly occur on the optical circuit. During these manufacturing and inspection processes of the optical circuit on the wafer, there is no way to completely eliminate the cause of such defects on the optical waveguide. Physical damages including scratches (hereinafter simply referred to as a "flaw") induce definitive deterioration in the characteristics of the optical waveguide such as an increase in a transmission loss, and a chip having a defective waveguide due to such a flaw does not satisfy performances in the characteristic aspect and thus cannot be used. Accordingly, in the manufacturing and inspection processes of the silicon optical circuit, a flaw on the wafer should be detected as early as possible to remove such a chip. Detection of such flaws on the silicon optical circuit chip has conventionally been conducted by visual inspection using a microscope.

However, detection by visual checking depends at least partially on sensory judgment by a human who visually conducts checking. Further, since a silicon circuit is an extremely small circuit, there has been limitation in completely conducting detection of a particularly small flaw under the vision of the microscope. A defective chip having a flaw which was overlooked in visual inspection is judged to be a good product by mistake and is flowed out to processes downstream of the visual inspection. Such a defective chip is not discovered until a characteristic inspection of a chip itself, which has been cut out from the wafer into the individual chip, is conducted or until a module characteristic inspection after package implementation is conducted, and thus, the defective chip has been failed to be judged as a failure at an early stage of the manufacturing process of the entire optical circuits.

As such, in the silicon optical circuit of the conventional technique, a flaw occurred during the manufacturing of the optical circuit in the state of a wafer has not been able to be completely removed by the visual inspection. As a result, there has been a problem that yields are reduced in the processes of chip characteristic inspection, package implementation, and module characteristic inspection, which are in the manufacturing and inspection processes located downstream of the process in the state of a wafer, thereby inducing increase in cost for the manufacturing and inspection of products.

An object of the present invention is to provide, in consideration of the above problems, an optical circuit that can objectively detect a flaw occurred in the manufacturing process of the silicon optical circuit on a wafer at an early stage by the inspection in the state of a wafer.

Solution to Problem

As one embodiment of the present invention, there is disclosed a silicon optical circuit having a function of detecting a flaw occurred on an optical circuit element formed on a substrate, the optical circuit comprising: an optical waveguide arranged along at least a part of a contour of a target circuit having a predetermined function by the optical circuit element and arranged proximate at a distance that does not cause optical coupling with the target circuit; and optical path conversion means disposed at both ends of the optical waveguide.

Preferably, the optical path conversion means may be either of a pair of grating couplers or a pair of couplers composed of two optical path conversion circuits each having a terminating face of the optical waveguide and a total reflection face which faces the terminating face and which reflects light emitted from the terminating face substantially vertically relative to an SOI substrate.

In addition, the target circuit, the optical waveguide, and the optical path conversion means may be composed of a silicon fine wire formed on the SOI substrate.

Further, at least part of a linear portion of the optical waveguide may be a multimode waveguide whose core width has been enlarged, and the multimode waveguide may also be connected to a waveguide of another portion of the optical waveguide via a tapered waveguide without mode conversion.

More preferably, the optical waveguide may not cross the target circuit and a portion of the optical waveguide along a contour of the target circuit may be arranged so as to keep a distance of 50 µm or less from the contour.

According to another embodiment of the present invention, the optical waveguide may include an outward portion arranged along a contour of the target circuit from one coupler of the optical path conversion means so as to substantially surround the target circuit and a return portion arranged by returning substantially parallel to the outward portion to reach the other coupler of the optical path conversion means, and the couplers of the optical path conversion means may be formed proximate and parallel to each other such that their incident angles face the same direction at the time of coupling to fiber components and an arrangement interval therebetween is 1 mm or less.

According to still another embodiment of the present invention, the target circuit may include at least two sub target circuits having an identical function or different functions, the optical waveguide may at least include: a loopback waveguide portion having an outward portion arranged along a contour of a first sub target circuit from one coupler of the optical path conversion means so as to surround the first sub target circuit and a return portion arranged by returning substantially parallel to the outward portion; and a waveguide portion between the sub target circuits arranged continuously from the loopback waveguide portion of the first sub target circuit along part of a contour that is not surrounded by the loopback waveguide portion of the contour of the first sub target circuit or along at least part of a contour of a second sub target circuit that is different from the first sub target circuit, and the couplers of the optical path conversion means may be formed proximate and parallel to each other such that their incident angles face the same direction at the time of coupling to fiber components and an arrangement interval therebetween may also be 1 mm or less.

Further, the optical circuit may also be carried out by comprising: a plurality of optical waveguides, each of which is for one of a plurality of target circuits formed on the substrate and arranged along at least part of a contour of each of the target circuits and arranged proximate at a distance that does not cause optical coupling with each of the target circuits; a plurality of corresponding optical path conversion means connected to the plurality of optical waveguides, respectively; a common single optical waveguide which is arranged proximate to each of the plurality of target circuits and each of the optical waveguides corresponding thereto and which is configured to be parallel to each of the plurality of optical waveguides extending over all of the plurality of target circuits; and common optical path conversion means connected to the common single optical waveguide.

Furthermore, the optical circuit may also be carried out by comprising: a plurality of optical waveguides, each of which is for one of a plurality of target circuits formed on the substrate and arranged along at least part of a contour of each of the target circuits and arranged proximate at a distance that does not cause optical coupling with each of the target circuits; a first wavelength multiplex/demultiplex circuit in which one end of each of the plurality of waveguides is connected to each of a plurality of output ends and in which light input to the input end is wavelength multiplexed/demultiplexed to the plurality of output ends; a second wavelength multiplex/demultiplex circuit in which the other end of each of the plurality of waveguides is connected to each of a plurality of output ends and in which light input to the input end is wavelength multiplexed/demultiplexed to the plurality of output ends, wherein the second wavelength multiplex/demultiplex circuit includes wavelength multiplexing/demultiplexing characteristics identical to those of the first wavelength multiplex/demultiplex circuit, each of the plurality of optical waveguides connected to the respective output ends having the same transmissible wavelength on the two wavelength multiplex/demultiplex circuits; and optical path conversion means connected to the input end of the first wavelength multiplex/demultiplex circuit and the input end of the second wavelength multiplex/demultiplex circuit.

Advantageous Effects of Invention

As described above, according to the optical circuit of the present invention, a flaw occurred in the manufacturing process of the silicon optical circuit on a wafer can be objectively detected by conducting inspection in the state of a wafer. Further, the optical circuit of the present invention allows detection of a flaw occurred in the manufacturing process of the silicon optical circuit with high accuracy in an earlier stage of the manufacturing process and effectively prevents a circuit including failure which has been overlooked in inspection in the state of a wafer from flowing out to subsequent processes. The time and cost for manufacturing products that employ silicon optical circuits can be reduced.

DESCRIPTION OF EMBODIMENTS

The optical circuit of the present invention is an optical circuit for inspection including, in addition to an optical circuit that implements desired functions, an optical waveguide for flaw detection which surrounds the entire optical circuit and which is sufficiently proximate to the optical waveguide of the optical circuit and optical path conversion means connected to the optical waveguide for detection. The optical path conversion means may be, for example, a pair of grating couplers or a pair of couplers composed of an optical path conversion circuit having a groove including a totally reflecting end face. Based on the transmission characteristic measurement of the optical waveguide for detection using the optical path conversion means, a flaw within each chip can be efficiently discovered in the state of a wafer before being cut into chips. A flaw can be efficiently discovered in a hierarchical manner by providing individual optical waveguides for detection for respective chips and by further forming one common optical waveguide for detection over the plurality of chips. The procedures of flaw detection in the state of a wafer will be explained below in detail together with detailed embodiments of the optical waveguides for detection in various aspects from a most fundamental configuration to a more complicated configuration. Firstly, the configuration of the optical circuit for inspection which is the most fundamental configuration of the present invention and its inspection procedures will be explained.

First Embodiment

Figure 1:
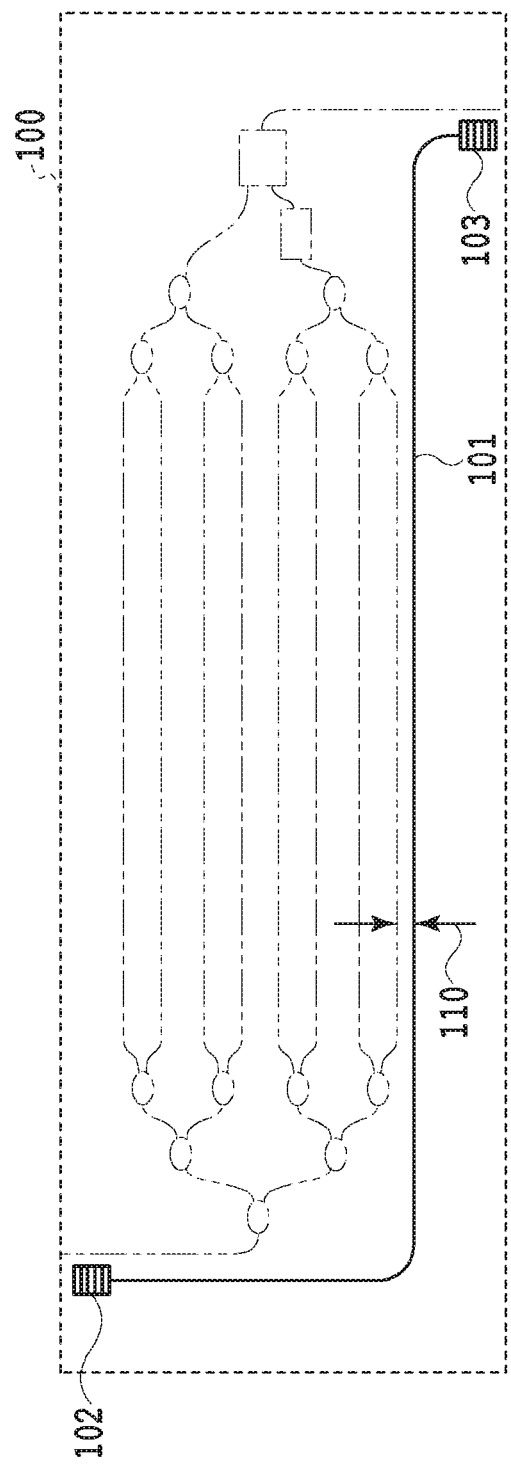
FIG. 1 is a plan view showing a configuration of an optical circuit for inspection according to a first embodiment of the present invention.
Figure 27A:
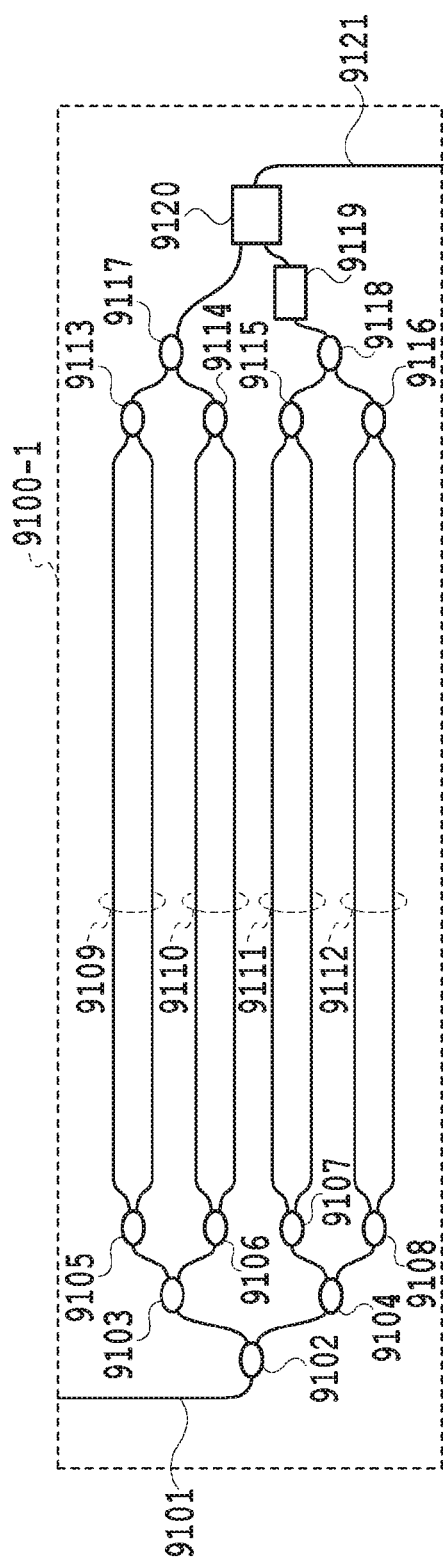
FIG. 27A is a diagram showing a configuration of an optical modulation circuit chip of a first example of a silicon optical circuit of a conventional technique.

FIG. 1 is a plan view showing a configuration of an optical circuit according to the first embodiment of the present invention. In FIG. 1, an area defined with dotted lines shows a silicon optical circuit chip 100, which is composed of a circuit completely identical to the optical modulation circuit of the conventional technique as illustrated in FIG. 27A. The silicon optical circuit chip 100 is one chip area on a silicon wafer, and in a case of cutting the wafer into a chip, this chip results in a single optical circuit chip. In FIG. 1, an optical modulation circuit which has the same configuration as that of the conventional technique is shown with dotted lines, and an explanation on a detailed configuration and operation will be omitted. The optical modulation circuit depicted with the dotted lines is an optical circuit that is to be a final product for implementing optical modulation functions, and a flaw occurred on the waveguide of the optical modulation circuit must be detected in an early stage in the manufacturing and inspection processes. For simplification, an optical circuit for implementing a predetermined function which is to be a target of flaw detection, such as the optical modulation circuit of FIG. 1, will be hereinafter called a "target circuit" throughout the explanations.

The optical circuit of the present invention includes an optical circuit for inspection depicted with a solid line in addition to the optical modulation circuit which is the above-described target circuit depicted with the dotted lines in FIG. 1. The optical circuit for inspection is composed of an optical waveguide 101 and grating couplers 102, 103 which are connected to both ends of the optical waveguide 101, respectively. These two grating couplers are also called a pair of grating couplers. The optical waveguide 101 is arranged so as to run along a periphery (contour) of a target circuit from an input waveguide of the target circuit to an output waveguide thereof and is arranged so as not to cross the waveguide of the target circuit.

Figure 2:
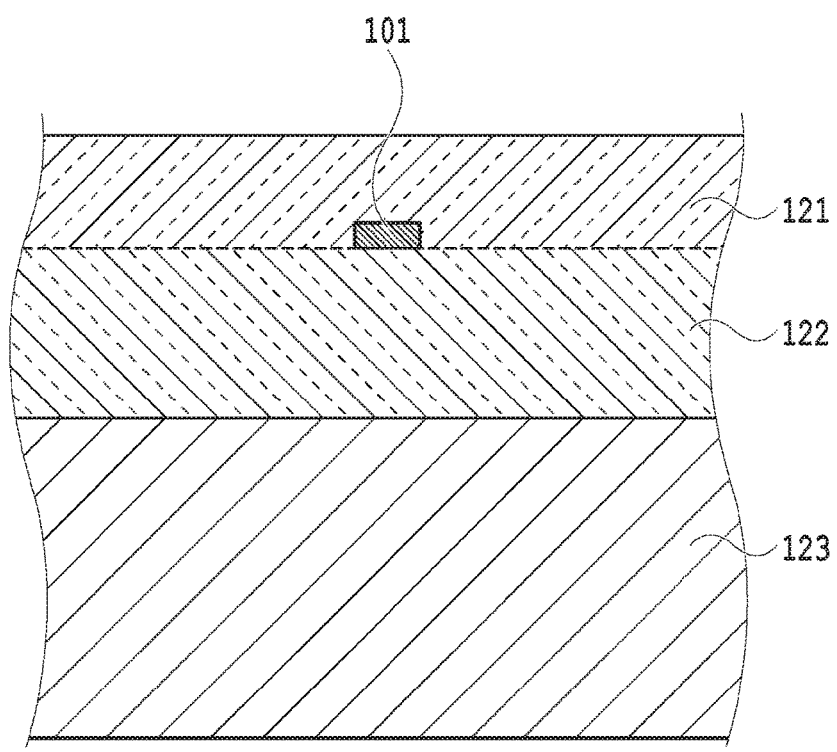
FIG. 2 is a diagram showing a cross sectional structure of an optical waveguide for detection in the optical circuit of the present invention.

FIG. 2 is a diagram showing a cross sectional structure of an optical waveguide for detection in the optical circuit of the present invention. FIG. 2 is a diagram viewing a cross section perpendicular to a waveguide in the vicinity of the optical waveguide for detection 101 in FIG. 1, and the optical waveguide 101 is composed of a channel-type waveguide formed of an SOI (Silicon On Insulator) substrate. Its core width is 0.5 μm and its core thickness is 0.22 μm. The channel-type optical waveguide is formed on a BOX (Buried OXide) layer 122 which is formed on a silicon substrate part 123 of the SOI substrate. It further includes a SiO2 cladding 121 formed so as to cover the optical waveguide (core) 101. The cladding 121 has a thickness of about 2 μm, and the BOX (Buried OXide) layer 122 has a thickness of about 2 μm.

Figure 3A:
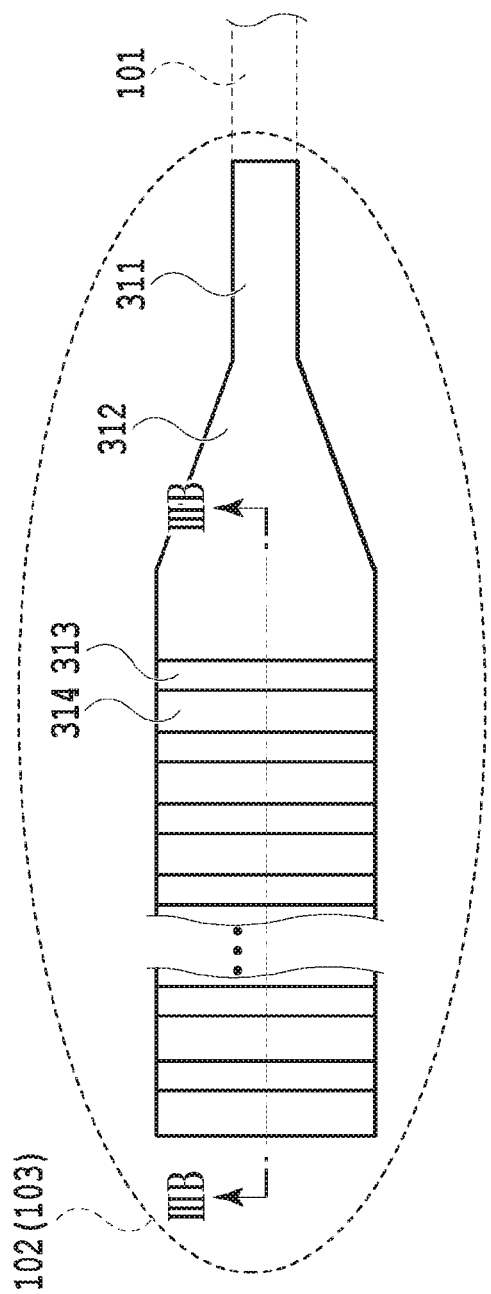
FIG. 3A is a top view showing a configuration example of grating couplers as an example of optical path conversion means in the optical circuit of the present invention.
Figure 3B:
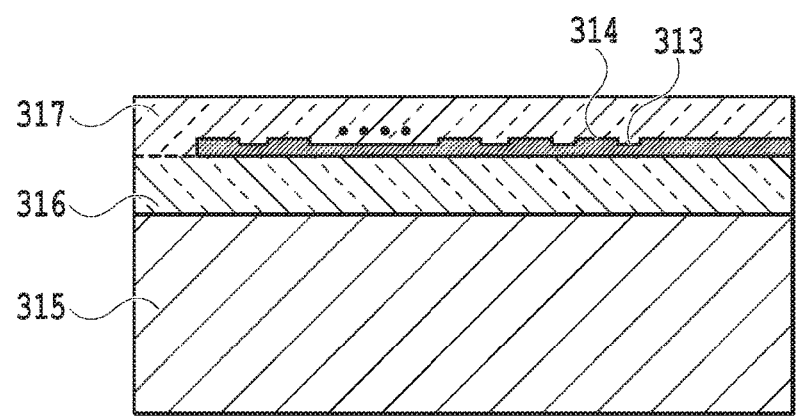
FIG. 3B is a sectional view showing the configuration example of the grating couplers as the example of the optical path conversion means in the optical circuit of the present invention.

FIG. 3A and FIG. 3B are diagrams showing a configuration example of a grating coupler as optical path conversion means in the optical circuit of the present invention. FIG. 3A shows a top view of one of the grating couplers 102 (103), in which one end of the grating coupler 102 is connected to the optical waveguide 311, and the optical waveguide 311 corresponds to the optical waveguide 101 of FIG. 1. Between the grating coupler 102 and the optical waveguide 311, a tapered waveguide 312 is provided. The grating coupler 102 includes a core portion 314 having a thick grating and a core portion 313 having a thin grating. In the tapered waveguide 312, from the optical waveguide 311 toward the grating coupler 102, the width of the waveguide is enlarged from 0.5 μm to 10 μm. It should be noted that, in each of the following embodiments, the grating couplers and the pair of grating couplers will be described as examples of optical path conversion means. However, the optical path conversion means can also be realized, besides the grating couplers, by couplers or a pair of couplers which are composed of an optical path conversion circuit having a groove including a tilted end face that allows total reflection, which will be described later.

FIG. 3B shows a structure of a cross section including line IIIB-IIIB in the top view of the grating coupler of FIG. 3A. The waveguide core portions 313, 314 forming the grating continuously to an extension of the core of the optical waveguide 311 are made of silicon. The waveguide core portions 313, 314 are formed on a BOX layer (lower part cladding) 316 which is formed on a silicon substrate part 315 of the SOI substrate, and above the waveguide core portions, an upper part cladding 317 is formed with SiO2. The pitch between gratings is 0.7 μm, and each length of the core portion 314 having a thick waveguide is 0.35 μm. Further, the thickness of the core portion 314 having a thick waveguide is 0.22 μm, the thickness of the thin core portion 313 is 0.15 μm, the thickness of the upper part cladding 317 is about 2 μm, and the thickness of the lower part cladding 316 is 2 μm.

Figure 4:
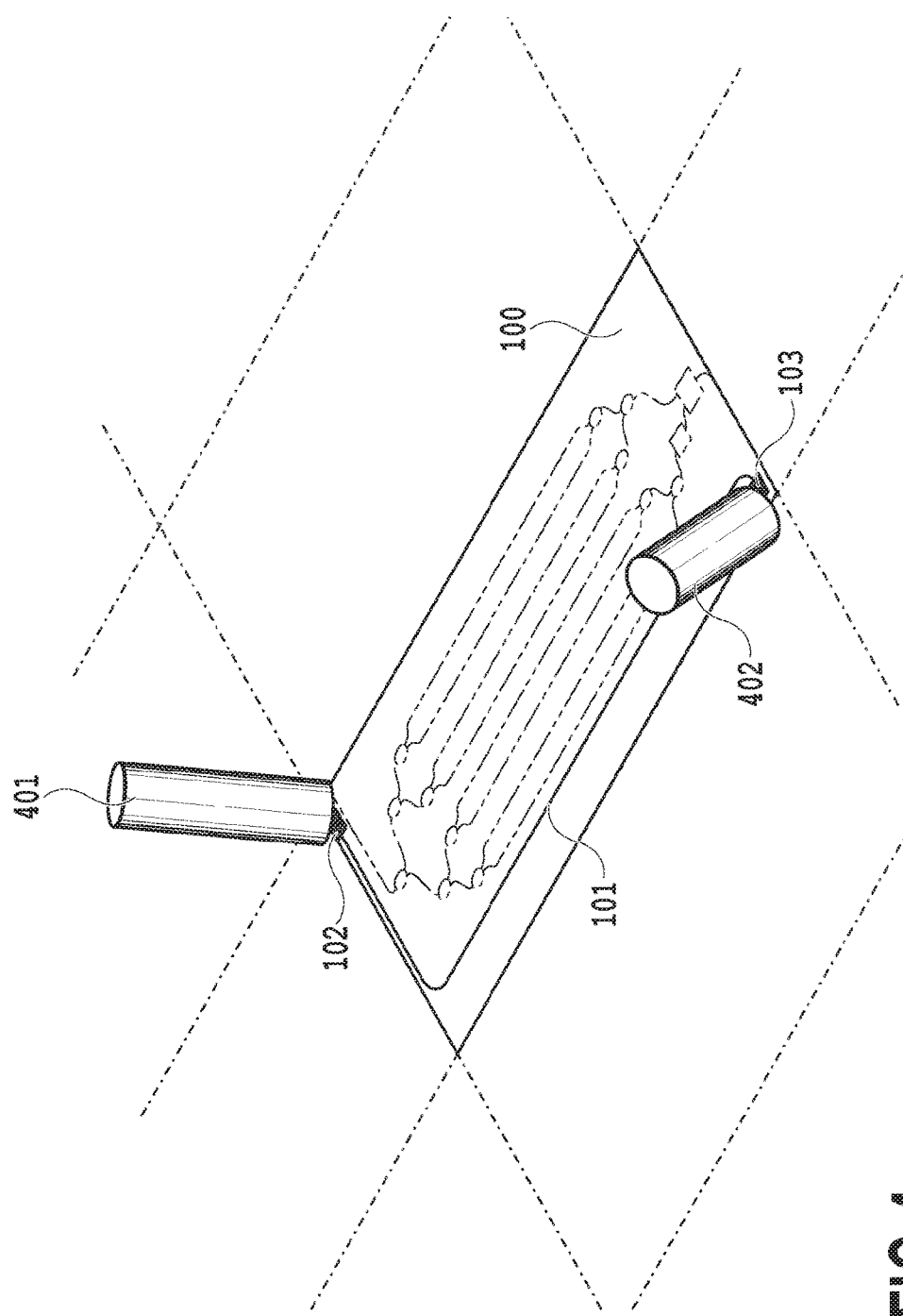
FIG. 4 is a diagram illustrating a method of an optical circuit inspection during a process using the optical circuit of the first embodiment of the present invention.

FIG. 4 is a diagram illustrating a method of an optical circuit inspection during a manufacturing process using the optical circuit of the first embodiment of the present invention. By using the grating couplers 102, 103 which are light input/output mechanisms, a method of measuring light transmittance characteristics of the optical waveguide for detection 101 in the state of a wafer before separating into individual chips is schematically shown.

The grating couplers 102, 103 can input or output light by changing a light direction from the channel-type optical waveguide toward an upper direction which is substantially perpendicular to the face constituting the optical circuit of the chip, that is, the silicon (SOI) substrate face. By use of the grating couplers, there is no need to cut the optical circuit into a chip to form an end face for inputting or outputting test light for flaw detection. In other words, it is possible to measure the characteristics of the optical circuit for inspection by inputting/outputting light to/from a circuit in the state amid the manufacturing of the optical circuit on a wafer or in the state of the wafer after the manufacturing of the optical circuit. In FIG. 4, the optical modulation circuit of FIG. 1, which is a target circuit, is shown in one rectangular area defined with dotted lines, and a plurality of rectangular areas are each aligned on the wafer in the state before being cut out into chips. With respect to a specific target circuit on the wafer, optical fibers 401, 402 are respectively brought closer to the grating couplers 102, 103 of the optical circuit of the present invention from the above for optical coupling. When connecting one optical fiber 401 to a light source for measurement and the other optical fiber 402 to a detector, light transmittance characteristics can be evaluated as in the case of inputting/outputting light from the end face of the substrate after cutting and separating into chips as in the conventional technique.

Figure 5:
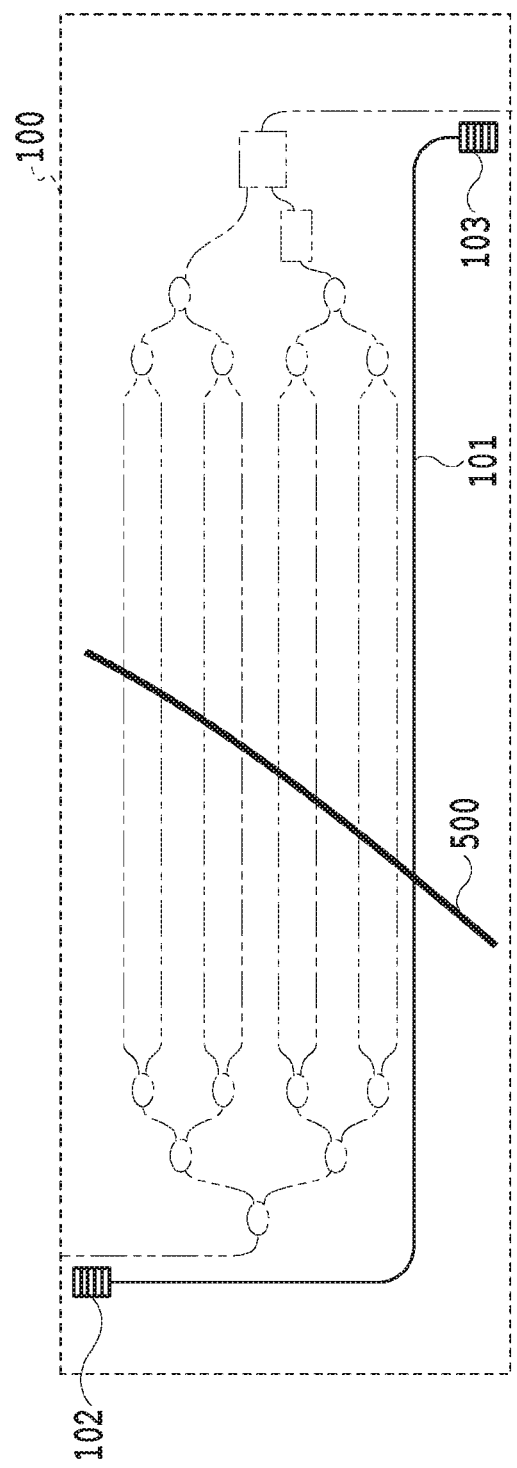
FIG. 5 is a diagram showing a state in which a scratch has occurred on an optical modulation circuit, which is a target circuit, during the manufacturing process.

FIG. 5 is a diagram showing a state in which a scratch has occurred on an optical modulation circuit, which is a target circuit, during its manufacturing process. In FIG. 5, a flaw 500 has occurred so as to traverse the optical waveguide for detection 101, together with the plurality of waveguides on the target circuit. In many cases where such a flaw occurs, a structural defect occurs on the waveguides of the target circuit and a critical error is caused to the characteristics of the target circuit. In FIG. 5, the case where the flaw 500 is within the size of a single chip is illustrated, but there may be a case where the flaw straddles a plurality of chips.

Figure 27B:
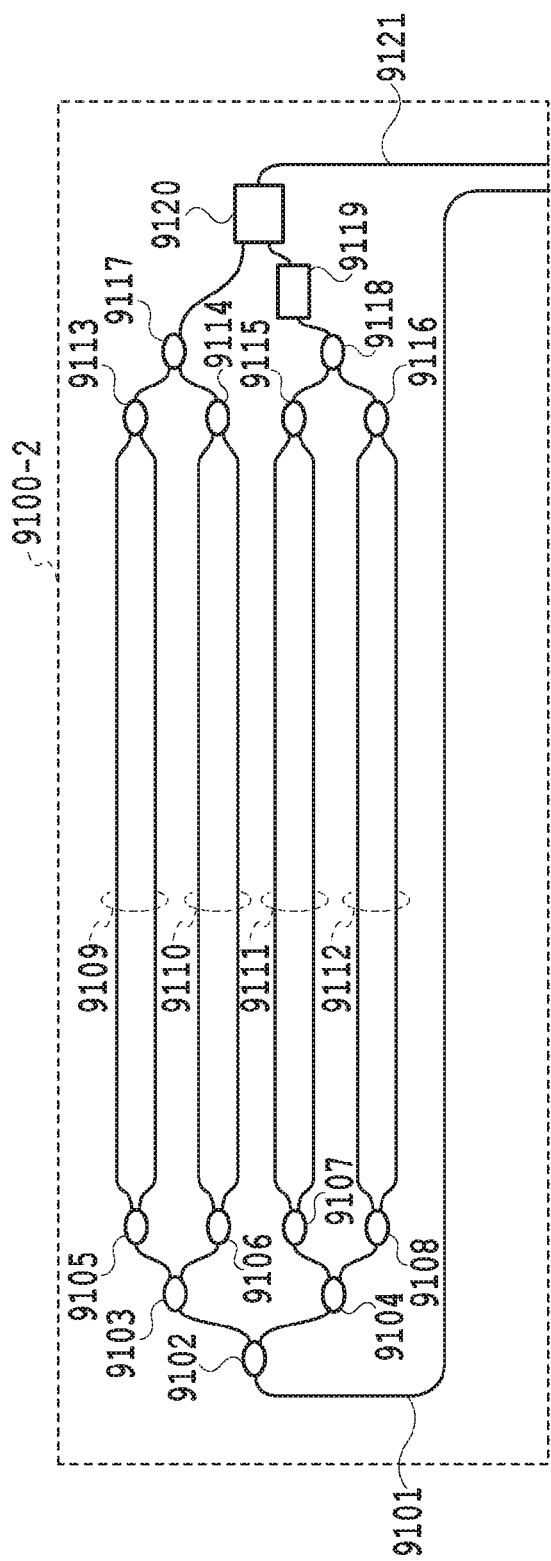
FIG. 27B is a diagram showing a configuration of another optical modulation circuit chip of the first example of the silicon optical circuit of the conventional technique.
Figure 28:
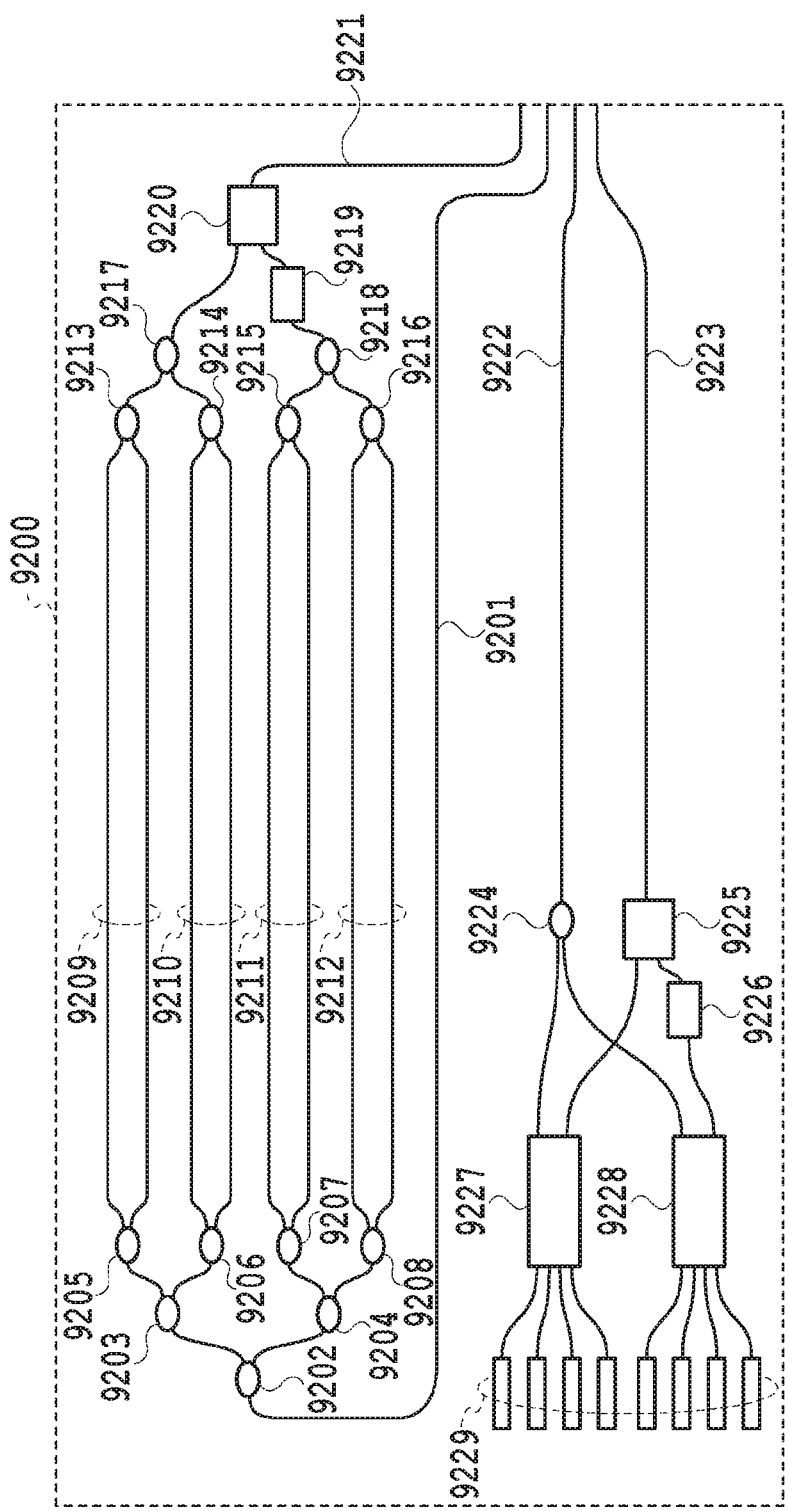
FIG. 28 is a diagram showing a configuration of an optical circuit in which an optical modulation circuit of a second example of a silicon optical circuit of a conventional technique and an optical reception circuit are integrated.

In the case where a flaw causing a defect on the target circuit occurs as shown in FIG. 5, a defect also occurs on the optical waveguide for detection 101 in the optical circuit of the present invention. It is desirable that the optical waveguide for detection 101 be arranged as close as possible to the outermost contour of the waveguide of the target circuit within a range in which light coupling does not occur. In the optical circuit of the present invention, the size of a flaw to be detected is equivalent to or larger than the interval between waveguides in the target circuit. In consideration of typical circuit configurations of the optical modulation circuit and the optical reception circuit and their intervals between waveguides as shown in FIG. 27A, FIG. 27B, and FIG. 28, a flaw is assumed to have a size of approximately 100 μm or more. This is because a probability in which a flaw traverses a waveguide within the target circuit, that is, a probability of deteriorating the characteristics of the target circuit will increase when the size of a flaw is equivalent to or larger than the interval between waveguides.

Figure 7:
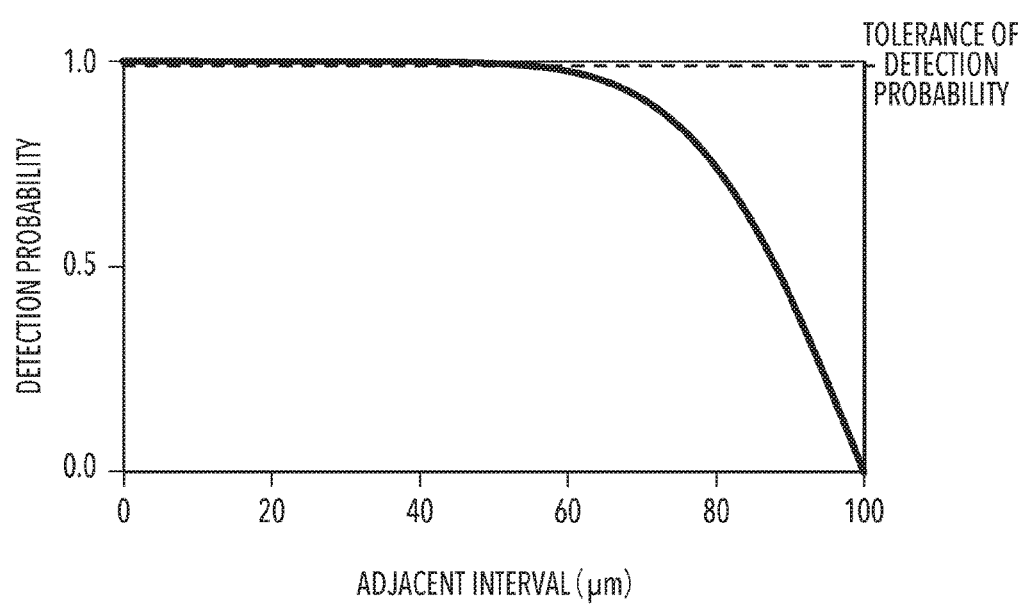
FIG. 7 is a graph showing the relation between an interval between a target circuit and an optical waveguide for detection and a detection probability of a flaw according to the optical circuit of the present invention.

FIG. 7 is a graph showing the relation between an interval between a target circuit and an optical waveguide for detection and a detection probability of a flaw according to the optical circuit of the present invention. This shows the detection probability of a flaw depending on an adjacent interval between the target circuit and the optical waveguide for detection 101 as shown in FIG. 1 when the size of a flaw is assumed to be 100 μm. Since it is naturally desirable that the detection probability of a flaw be nearly 1, in order to achieve a tolerance of detection probability to be 0.99 or more, an appropriate adjacent interval 110 is to be 50 μm at most according to FIG. 7. As the optical waveguide 101 is arranged as close as possible to the target circuit, the probability in which a flaw to be detected is caused on the target circuit and the optical waveguide 101 at the same time can be increased. Therefore, in the target circuit of FIG. 1, in the vicinity of three-step optical couplers located in a lower left part, the optical waveguide for detection 101 is depicted slightly apart from the target circuit, but it is preferable that the optical waveguide for detection 101 be sufficiently close to an optical coupler even in the part in the vicinity of this optical coupler. It should be noted that the occurrence of a flaw in the present invention is not limited to the one occurred only on the optical waveguide, but in the optical circuit of the present invention, a flaw on all other circuit elements within the target circuit can also be detected.

In general, the target circuits are arranged so as to be organized within an area as compact as possible on a chip substrate in terms of cost. Therefore, the optical waveguide for detection in the present invention is arranged along the periphery of an area of the target circuit, that is, along a contour thereof. In terms of reliably detecting a flaw within the target circuit, the optical waveguide for detection should surround as much part (whole circumference) of the contour of the target circuit as possible. In addition, it is desirable that the optical waveguide 101 be arranged along the target circuit from one end to the other end as much as possible. Therefore, it is preferable that the optical waveguide 101 be arranged along the outer shape (contour) of the target circuit in a longitudinal direction. Due to this arrangement, when a flaw occurs in any part of the target circuit, the flaw also occurs on the optical waveguide 101 at the same time, and thus the probability of detecting the flaw will be increased. In this regard, positions of the grating couplers 102, 103 may not necessarily be located near the input/output terminals of the target circuit, and may be arranged on arbitrary positions that are convenient for inspection during the manufacturing process of the optical circuit.

Figure 6:
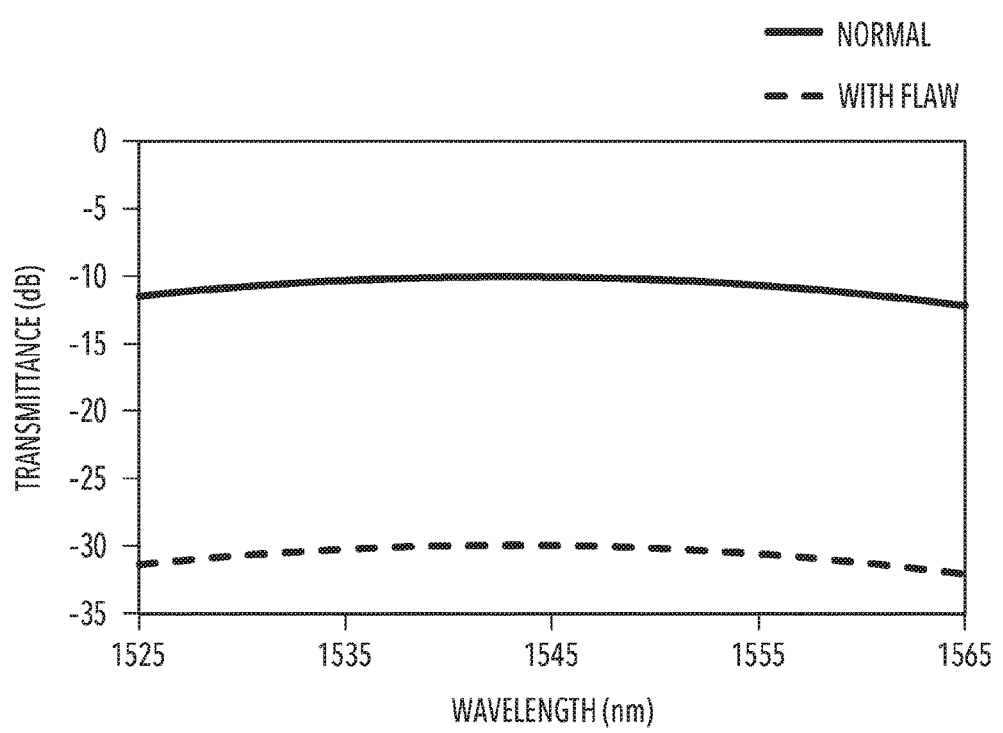
FIG. 6 is a graph showing transmission spectra obtained in cases with/without a flaw according to the optical circuit of the present invention.

FIG. 6 is a graph showing transmission spectra obtained in cases with/without a flaw according to the optical circuit of the first embodiment of the present invention. In the optical circuit shown in FIG. 1 or FIG. 5, light is input to or output from the grating couplers 102, 103 using the method described in FIG. 4 to measure a transmission spectrum of the optical waveguide 101. In FIG. 6, a spectrum of nearly a C band wavelength area is shown. A solid line denoted as "normal" in FIG. 6 represents a transmission spectrum in the case where the target circuit has no flaw as shown in FIG. 1. Meanwhile, a dotted line denoted as "with flaw" in FIG. 6 represents a transmission spectrum in the case where a flaw occurs on the target circuit and a defect also exists on the optical waveguide 101 as shown in FIG. 5. The grating couplers have wavelength dependence on the rate of coupling with an optical fiber, and the grating couplers 102, 103 of FIG. 3A and FIG. 3B are designed such that the vicinity of the wavelength of 1545 nm has a maximum coupling rate. On the transmission spectrum shown in FIG. 6, the coupling rate between the grating couplers 102, 103 and the optical fiber and the propagation loss according to the length of the optical waveguide 101 are reflected. Moreover, when a flaw exists in the optical circuit as shown in FIG. 5, a defect occurred on the optical waveguide 101 causes a great loss, and thus, the loss is also reflected on the transmission spectrum. Therefore, a great difference appears in the level of the transmission spectrum between the case with a flaw on the optical circuit and the case without a flaw thereon.

As shown also in FIG. 4, in the optical circuit of the present invention, a transmission spectrum is measured on the optical circuits for inspection fabricated so as to be adapted to the target circuits one to one in a plurality of rectangular areas formed on the wafer to judge the presence/absence of a flaw. The transmission spectrum is measured on all target circuits within the wafer to compare the transmission spectrum with the "normal" state, and a target circuit having a flaw that causes a defect on a waveguide can be detected from a deviation from the "normal" state of transmittance.

Therefore, the optical circuit of the present invention can be carried out, in the silicon optical circuit having a function of detecting a flaw occurred on an optical circuit element formed on the substrate, by comprising an optical waveguide arranged along at least a part of a contour of the target circuit having a predetermined function by the optical circuit element and arranged proximate at a distance that does not cause optical coupling with the target circuit and a pair of grating couplers disposed at both ends of the optical waveguide. Preferably, the target circuit, the optical waveguide, and the pair of grating couplers are composed of a silicon fine wire formed on the SOI substrate.

A favorable aspect of a flaw detection according to the optical circuit of the present invention is, firstly, that more reliable detection of failure (flaw) during the manufacturing process can be achieved based on objective data, that is, transmittance characteristics of the optical circuit, without relying on subjective and sensory decisions by a measurer as by the visual inspection of a conventional technique. Secondly, another aspect is that detection is made by light transmittance characteristic of the optical waveguide which is obtainable in a stable and immediate manner without the need to supply power to the optical circuit, and thus, measurement for multiple circuits can be automated. Due to this, operation cost and time for a personnel can be reduced compared to the visual inspection of a conventional technique, and, in addition, it is fairly possible to reduce inspection time as well. Thirdly, according to the optical circuit of the present invention, still another aspect is that, since measurement and detection can be made at a wafer level before being cut into individual chips, a target circuit having failure (flaw) can be specified in earlier stage of the manufacturing process of the optical circuit. Due to this, total manufacturing time can be reduced by omitting beforehand inspections and the like for the specified circuit in the processes after the discovery of the failure.

In the description of FIG. 6, it has been explained that the transmission spectrum is measured for detecting a flaw, but a defect caused by the flaw is detected as a difference in a transmission loss, and thus, instead of making measurement by scanning all of certain wavelength bands, the loss measurement with a single wavelength can be sufficiently used for detection. Accordingly, in terms of further reduction of measuring time, measuring only the loss with a single wavelength is desirable.

The inspection in the optical circuit of the present invention can be made on the manufactured wafer at a timing immediately before being cut into chips. More preferably, it is effective to make inspection at a timing immediately after machining and forming silicon waveguides or immediately after further depositing upper part cladding after machining silicon waveguides. Due to this, by detecting a flaw on the target circuit having a flaw in the stage of machining silicon waveguides, it is possible to omit an electrode inspection and the like of the already detected target circuit having the flaw in the electrode forming or the like, which is a wafer manufacturing process located further downstream, thereby leading to further reduction of manufacturing time.

As described above in detail, the optical circuit of the present embodiment enables objective detection of a flaw occurred in the manufacturing process of the silicon optical circuit on a wafer in an earlier stage in the inspection in the state of a wafer.

Second Embodiment

Figure 8:
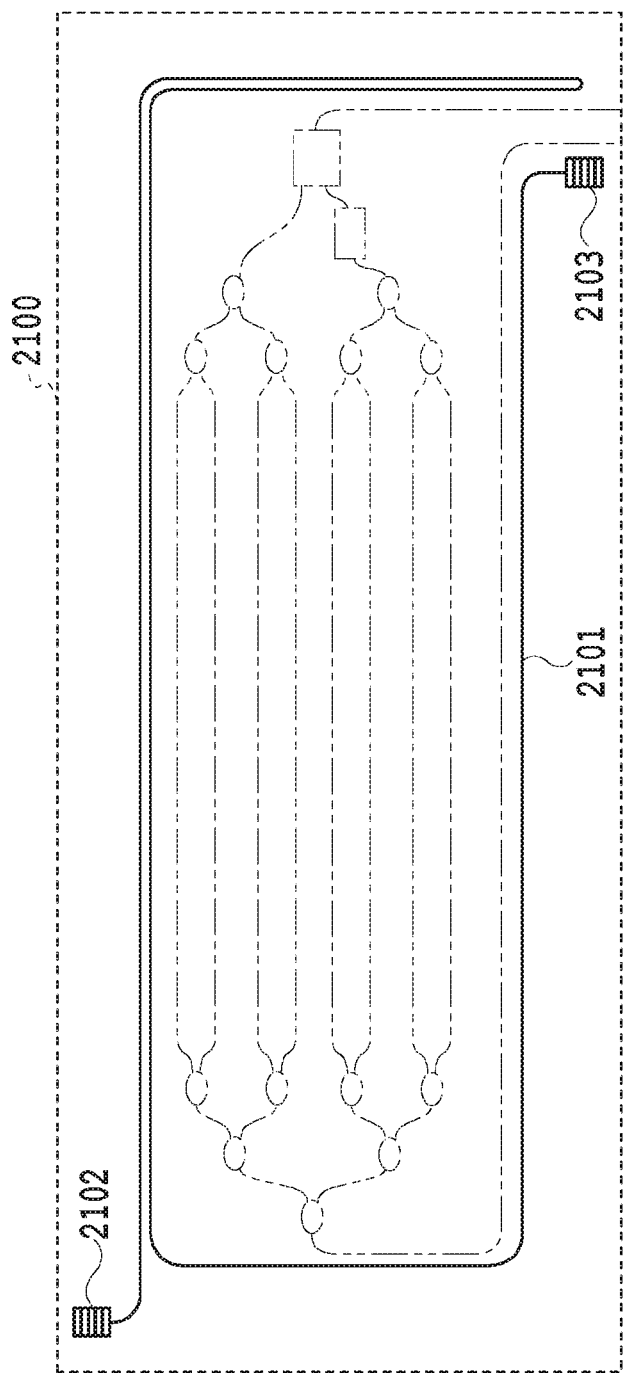
FIG. 8 is a plan view showing a configuration of an optical circuit according to a second embodiment of the present invention.

FIG. 8 is a plan view showing a configuration of an optical circuit according to the second embodiment of the present invention. A rectangular area defined by dotted lines in FIG. 8 shows a silicon optical circuit chip 2100, which is composed of a circuit completely identical to the optical modulation circuit of a conventional technique as illustrated in FIG. 27B. The silicon optical circuit chip 2100 is also one chip area on a silicon wafer, and further is a single optical circuit chip when being cut into chips from the wafer. In FIG. 8, an optical modulation circuit having a configuration identical to the conventional technique is shown with dotted lines, and an explanation on a detailed configuration and operation will be omitted here as in the first embodiment. The optical modulation circuit shown with the dotted lines in FIG. 8 is a target circuit for implementing a predetermined function which is to be a target of flaw detection.

The optical circuit of the present embodiment includes, in addition to the optical modulation circuit which is a target circuit depicted with the dotted lines in FIG. 8, an optical circuit for inspection depicted with a solid line. The optical circuit for inspection is composed of an optical waveguide 2101 and grating couplers 2102, 2103 which are connected to the both ends of the optical waveguide 2101. The configuration of the optical waveguide 2101 and the grating couplers 2102, 2103 is identical to that of the first embodiment. The optical waveguide 2101 is arranged so as to run along the periphery of the circuit from an input waveguide to an output waveguide of the target circuit and is arranged so as not to traverse the waveguides of the target circuit. In the first embodiment, the optical waveguide for detection 101 is arranged along only one of the long sides (one-sided) of the contour of the target circuit. In contrast, in the present embodiment, the optical waveguide 2101 is arranged along nearly the entire contour of the target circuit so as to surround the entire periphery of the target circuit including both of the long sides (both-sided) of the contour of the target circuit.

Figure 9:
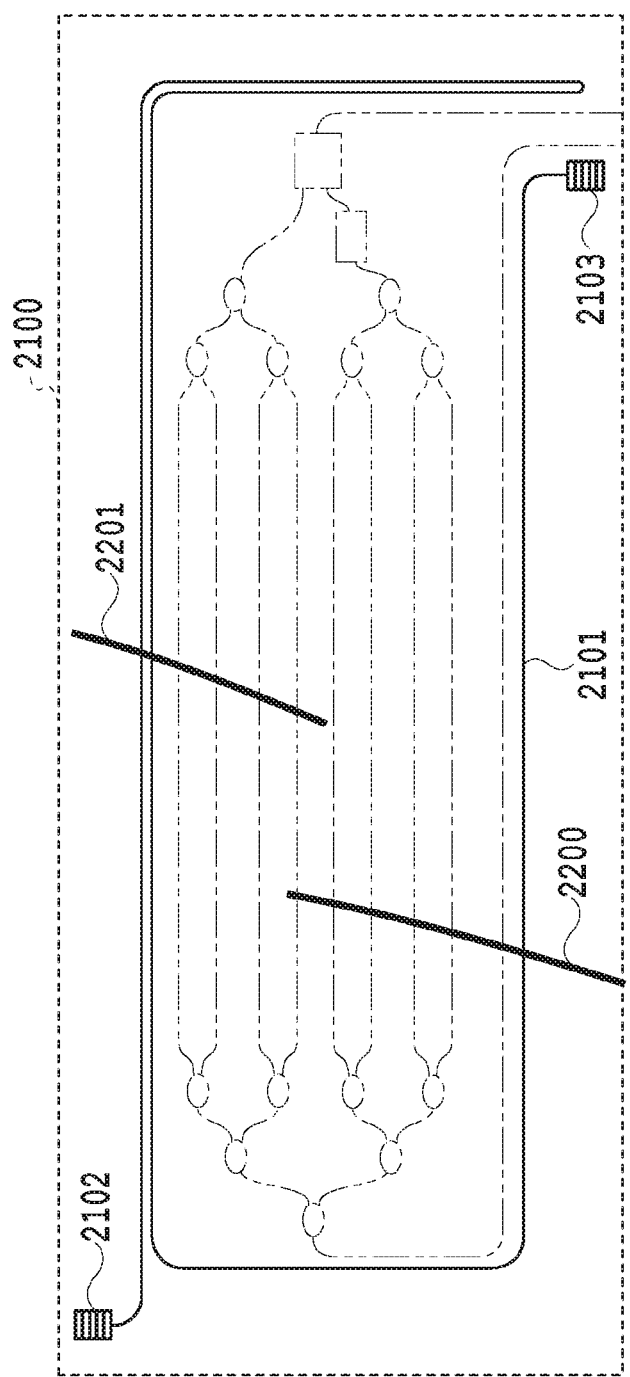
FIG. 9 is a diagram showing a state in which scratches have occurred on a target circuit according to the optical circuit of the second embodiment.

FIG. 9 is a diagram showing a state in which scratches have occurred on a target circuit according to the optical circuit of the second embodiment. As in the present embodiment, the arrangement of the optical waveguide 2101 allows reliable detection of flaws in the manufacturing process even if they are smaller flaws 2200, 2201 that traverse only part of the target circuit and do no traverse the whole. In other words, even smaller flaws can be effectively detected in the present embodiment compared to the first embodiment in which the optical waveguide for detection is provided only on one side of the contour of the target circuit.

In the present embodiment as well, it is desirable that the optical waveguide 2101 be arranged, as in the first embodiment, as close as possible to the outermost contour of the waveguide of the target circuit within a range in which light coupling does not occur. The appropriate adjacent interval between the waveguide of the target circuit and an optical waveguide for detection 2101 is 50 μm at most. Since the method of inspection during the process using the optical circuit of the present invention is completely identical to that of the first embodiment, its explanation will be omitted.

As described above, according to the optical circuit of the present embodiment, a flaw occurred in the manufacturing process of the silicon optical circuit on a wafer can be objectively detected in an earlier stage in the inspection in the state of a wafer, and further, flaws including smaller ones compared to those in the first embodiment can be detected with higher sensitivity.

Third Embodiment

Figure 10:
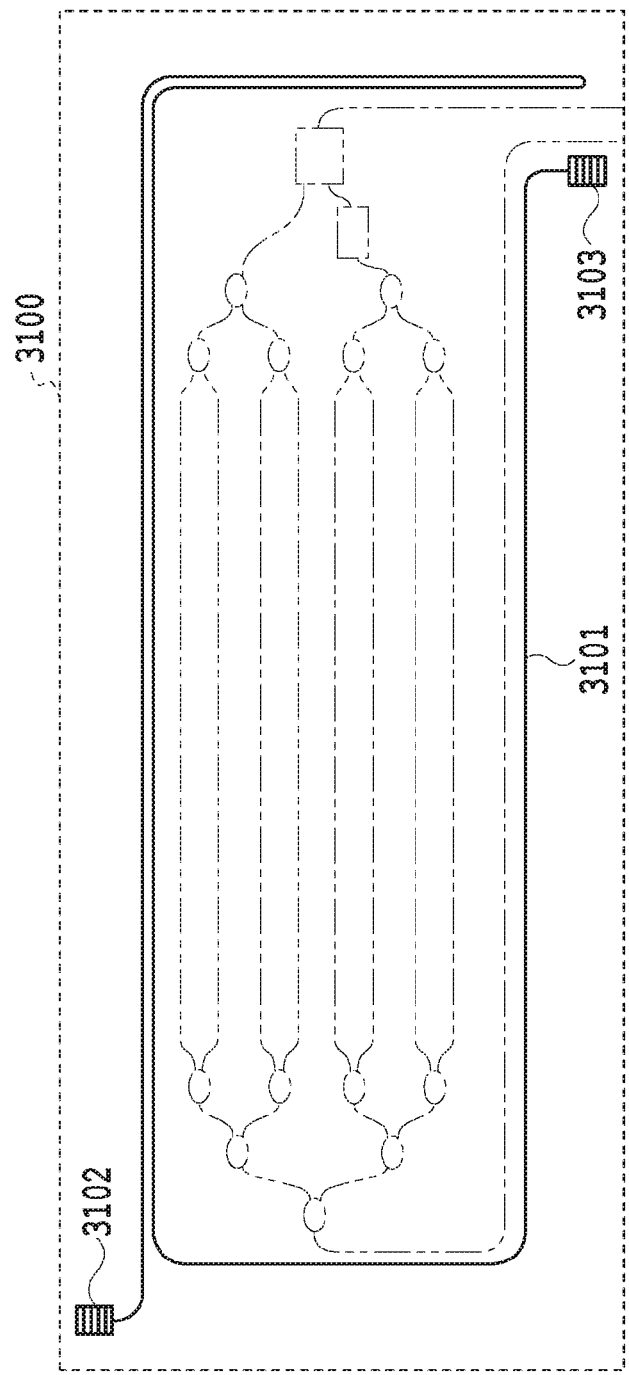
FIG. 10 is a plan view showing a configuration of an optical circuit according to a third embodiment of the present invention.

FIG. 10 is a plan view showing a configuration of an optical circuit according to the third embodiment of the present invention. In FIG. 10, a rectangular area defined by dotted lines shows a silicon optical circuit chip 3100, which is composed of a circuit completely identical to the optical modulation circuit of a conventional technique as illustrated in FIG. 27B. The silicon optical circuit chip 3100 is also one chip area on a silicon wafer, and further is a single optical circuit chip when being cut into chips from the wafer. In FIG. 10, an optical modulation circuit having a configuration identical to the conventional technique is shown with dotted lines, and an explanation on a detailed configuration and operation will be omitted here as in the conventional technique and the second embodiment. The optical modulation circuit shown with the dotted lines in FIG. 8 is a target circuit for implementing a predetermined function which is to be a target of flaw detection.

The optical circuit of the present embodiment includes, in addition to the optical modulation circuit which is a target circuit depicted with the dotted lines in FIG. 10, an optical circuit for inspection depicted with a solid line. The optical circuit for inspection is composed of an optical waveguide 3101 and grating couplers 3102, 3103 which are connected to both ends of the optical waveguide 3101. Two grating couplers 3102, 3103 are also called a pair of grating couplers. The configuration of the optical waveguide 3101 and the grating couplers 3102, 3103 is identical to those of the first embodiment and the second embodiment, but the present embodiment has a feature in the structure of the optical waveguide 3101.

Figure 11:
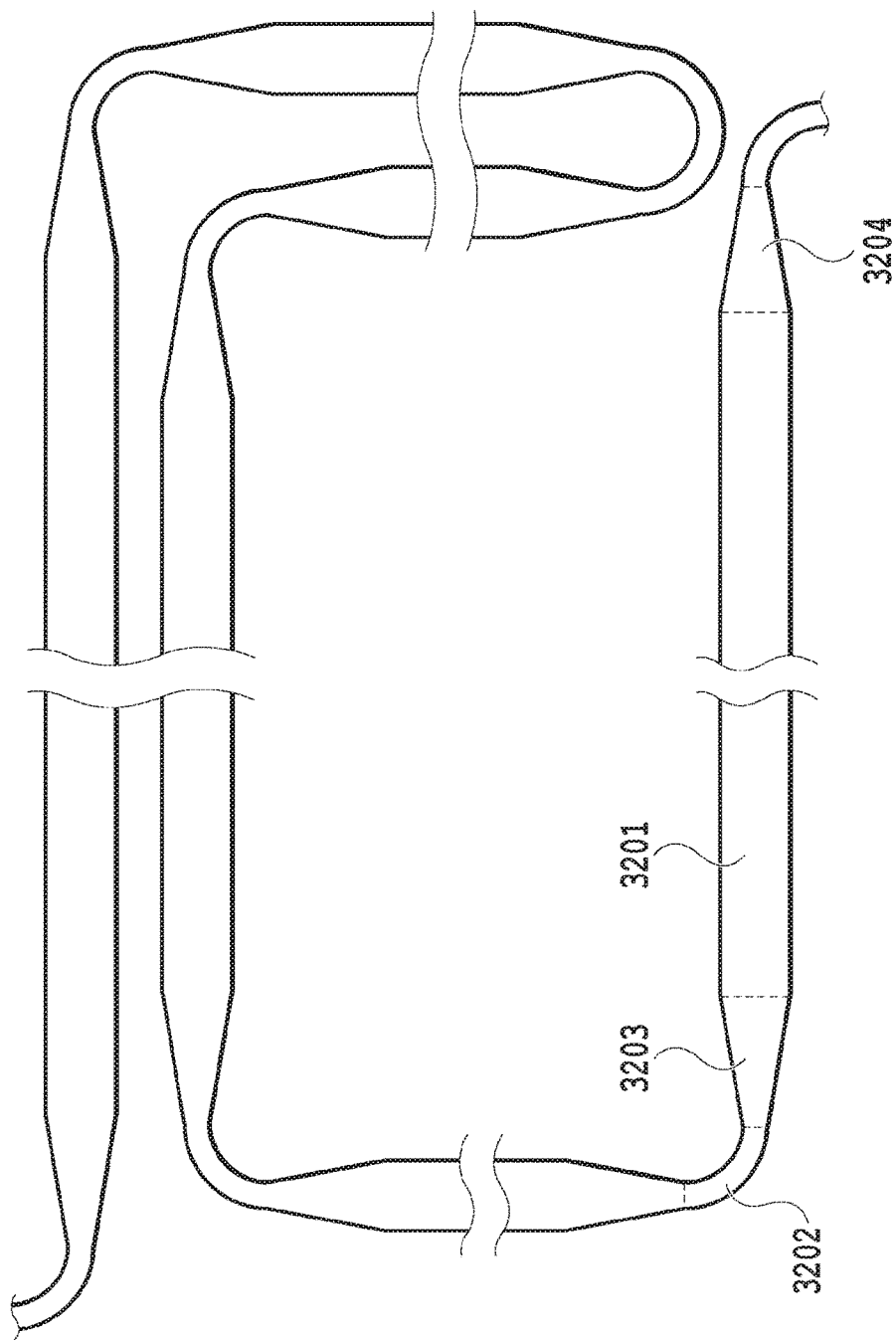
FIG. 11 is a diagram showing an optical waveguide structure of the optical circuit according to the third embodiment of the present invention.

FIG. 11 is a diagram showing an optical waveguide structure of the optical circuit according to the third embodiment of the present invention. In the optical waveguide for detection 3101 in the present embodiment, a curve portion 3202 for changing a direction of the waveguide has a core width of 0.5 μm as in the second embodiment, which forms a single-mode waveguide. Meanwhile, the core width of a linear portion 3201 is enlarged compared to that of the curve portion 3202 to form a multimode waveguide. Between the waveguides having different widths between curved waveguides and linear waveguides, tapered waveguides 3203, 3204 have a feature in which their core widths are continuously transformed.

Therefore, the optical circuit of the present embodiment can be carried out as an optical circuit, in which at least part of a linear portion of the optical waveguide is a multimode waveguide whose core width has been enlarged, and the multimode waveguide is connected to a waveguide of another portion of the optical waveguide via a tapered waveguide without mode conversion.

The optical waveguide for detection 2101 in the second embodiment is a single-mode waveguide over the entire length, and it is possible to detect a flaw without any problem by an inspection using the transmission spectrum of the optical waveguide. However, in general, the single-mode waveguide of the silicon fine wire (0.5 in width×0.22 μm in height) has a propagation loss of 2 to 4 dB/cm. Since a value of the propagation loss changes according to a machining error or the lot of SOI wafer, some extent of fluctuation occurs by each wafer fabrication or within the surface of the wafer. Therefore, in a case where the size of a target circuit is relatively large and the total length of the optical waveguide for inspecting a flaw becomes large, a transmission spectrum or a loss measurement value for judging presence/absence of a flaw fluctuates by each wafer fabrication and have variations within the surface of the wafer. Such fluctuation and variation of the measured values cause noise in detecting and judging the presence/absence of a flaw in the optical circuit, thereby deteriorating the accuracy of the detection.

Thus, in the case where the linear waveguide portion within the optical waveguide for detection 3101 is the multimode waveguide as in the present embodiment, the propagation loss of the waveguide 3101 can be significantly reduced. For instance, when a core height remains to be 0.22 μm and the core width of the waveguide is set to be 1.5 μm, the propagation loss of a basic mode is 0.5 dB/cm or less, which is an extremely small value compared to the propagation loss of the single-mode waveguide. By suppressing the absolute value of the propagation loss, variations of the optical circuits themselves caused by each wafer fabrication or caused within the surface of the wafer can also be suppressed. When compared with the case of the second embodiment, a difference in spectra in the case of "normal" and the case of "with flaw" shown in FIG. 6 due to noise reduction becomes stable and clear, thereby enhancing detection accuracy for detecting and judging the presence/absence of a flaw in the optical circuit.

In general, the naming of a multimode waveguide refers to a waveguide capable of propagating a plurality of modes, but actually, it is important to propagate only light of a basic mode in the optical waveguide for detection of the present invention. In order to do so, it is necessary to make adiabatic propagation in the tapered waveguide, and thus it is necessary to design an angle of widening the core width of the tapered waveguide more gradually to some extent. It is desirable that a widening angle of the core be five degrees or less as a criterion, and when the core width of the linear portion 3201 of the multimode waveguide is set to be 1.5 μm, it is desirable that the lengths of the tapered waveguides 3203, 3204 each be about 15 μm or more.

In the present embodiment as well, it is desirable that, as in the first embodiment and the second embodiment, the optical waveguide 3101 be arranged as close as possible to the outermost contour of the waveguide of the target circuit within a range in which light coupling does not occur. The appropriate adjacent interval between the waveguide of the target circuit and the optical waveguide for detection is 50 µm at most. In the present embodiment as well, since the method of inspection in the process using the optical circuit is completely identical to that of the first embodiment, its explanation will also be omitted here.

Figure 12:
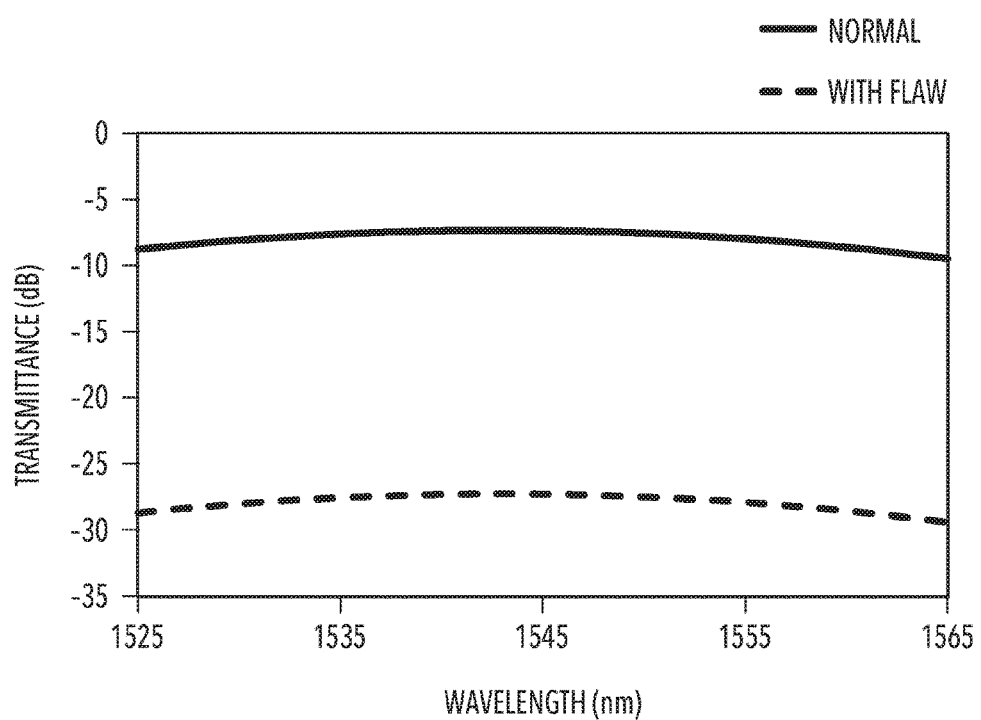
FIG. 12 is a graph showing transmission spectra obtained in cases with/without a flaw according to the optical circuit of the third embodiment.

FIG. 12 is a graph showing transmission spectra obtained in cases with/without a flaw according to the optical circuit of the third embodiment of the present invention. In the optical circuit of FIG. 10, light is input to and output from the grating couplers 3102, 3103 to measure the transmission spectrum of the optical waveguide 3101. A solid line denoted as "normal" in FIG. 12 represents a transmission spectrum in the case where the target circuit has no flaw. Meanwhile, a dotted line denoted as "with flaw" in FIG. 12 represents a transmission spectrum in the case where a flaw occurs on the target circuit and a defect also exists on the optical waveguide 3101. The grating couplers have wavelength dependence on the rate of coupling with an optical fiber, and the grating couplers 3102, 3103 of FIG. 10 are also designed such that the vicinity of the wavelength of 1545 nm has a maximum coupling rate. On the transmission spectrum shown in FIG. 12, as in the first embodiment and the second embodiment, the coupling rate between the grating couplers 3102, 3103 and the optical fiber and the propagation loss according to the length of the optical waveguide 3101 are reflected. In the present embodiment, as shown in FIG. 11, the core width of the linear portion of the optical waveguide 3101 is enlarged so as to significantly reduce the propagation loss. Therefore, it can be recognized that, transmittance of the transmission spectrum in the case of "normal" is increased (the loss of a circuit is reduced) compared to the spectrum of the first embodiment shown in FIG. 6. Accordingly, even when a flaw is present and the amount of loss increase is not too large due to the extent of the flaw being relatively small, it is possible to reliably detect the presence/absence of a flaw because there is no variation in measured values.

As described above, according to the optical circuit of the present embodiment, a flaw occurred in the manufacturing process of the silicon optical circuit on a wafer can be objectively detected in an earlier stage in the inspection in the state of a wafer, and further, can be detected with higher accuracy compared to those in the first embodiment and the second embodiment.

Fourth Embodiment

Figure 13:
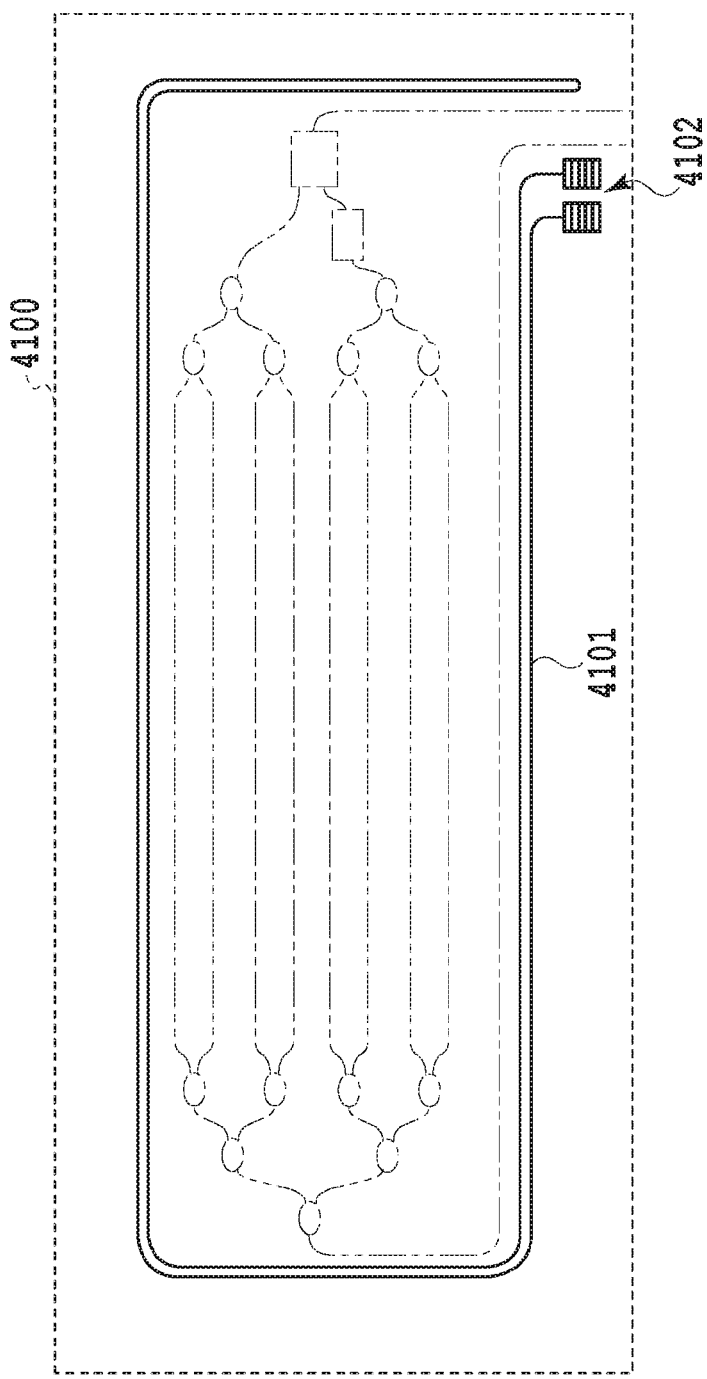
FIG. 13 is a plan view showing a configuration of an optical circuit according to a fourth embodiment of the present invention.

FIG. 13 is a plan view showing a configuration of an optical circuit according to the fourth embodiment of the present invention. In FIG. 13, a rectangular area defined by dotted lines shows a silicon optical circuit chip 4100, which is composed of a circuit completely identical to the optical modulation circuit of a conventional technique as illustrated in FIG. 27B. The silicon optical circuit chip 4100 is also one chip area on a silicon wafer, and further is a single optical circuit chip when being cut into chips from the wafer. In FIG. 13, an optical modulation circuit having a configuration identical to the conventional technique is shown with dotted lines, and an explanation on a detailed configuration and operation will be omitted here as in the conventional technique, the second embodiment, and the third embodiment. The optical modulation circuit shown with the dotted lines in FIG. 13 is a target circuit for implementing a predetermined function which is to be a target of flaw detection.

The optical circuit of the present embodiment includes, in addition to the optical modulation circuit which is a target circuit depicted with the dotted lines in FIG. 13, an optical circuit for inspection depicted with a solid line. The optical circuit for inspection is composed of an optical waveguide 4101 and a pair of grating couplers 4102 which are connected to both ends of the optical waveguide 4101. The configuration of the optical waveguide 4101 and the pair of grating couplers 4102 is identical to those of the first to third embodiments, but the present embodiment has a feature in the arranging position of the pair of grating couplers 4102, as will be described later.

In the present embodiment, as in the second embodiment and the third embodiment, an optical waveguide 4101 is arranged so as to surround the entire target circuit, and, as in the third embodiment, the linear portion of the optical waveguide 4101 has an enlarged core width to form a multimode waveguide so as to reduce the propagation loss. In other words, the core width of a curved portion within the optical waveguide 4101 is 0.5 µm and the core width of the linear portion is 1.5 µm. Furthermore, a portion connecting the linear portion and other portions has a continuously transformed core width as a tapered waveguide, and the length of each tapered waveguide is 15 µm in order to somewhat gradually form an angle to enlarge the core width.

Further, in the present embodiment as well, it is desirable that, as in the above embodiments, the optical waveguide for detection 4101 be arranged as close as possible to the outermost contour of the waveguide of the target circuit within a range in which light coupling does not occur. The appropriate adjacent interval between the waveguide of the target circuit and the optical waveguide for detection is 50 µm at most.

The present embodiment has a feature in a relative positional relation between the two of the pair of grating couplers 4102. In the first to third embodiments, two grating couplers are disposed in the vicinity of two corners that are farthest from each other within the rectangular chip area. In contrast, in the present embodiment, two grating couplers are formed proximate and parallel to each other such that their incident angles face the same direction at the time of coupling to fiber components and disposed together in the vicinity of one corner location. As such, the arrangement of the pair of grating couplers enables the optical waveguide for detection 4101 in the present embodiment shown in FIG. 13 to be configured so as to surround approximately entire periphery of the contour of the target circuit by using the configuration of a loopback waveguide having outward and return paths. In other words, the optical waveguide 4101 can be configured to include an outward portion arranged along a contour of the target circuit from one coupler of the pair of grating couplers 4102 so as to substantially surround the target circuit and a return portion arranged by returning substantially parallel to the outward portion to reach the other coupler of the pair of grating couplers.

By adopting such an arrangement of the grating couplers, an advantage described below will be obtained. In an inspection device which causes an optical fiber to access, from above, a wafer surface on which an optical circuit is fabricated and which performs measurement by light input/output, it is important to maintain an angle of entering light against the wafer surface and a distance between the end of the optical fiber and a circuit surface to be always constant, respectively, in order to obtain sufficient measurement accuracy. Therefore, in view of obtaining sufficient measurement accuracy and stability, it is further desirable that the optical fiber have only one drive mechanism and that an optical probe having an input optical fiber and an output optical fiber fixed at a specific interval be used. In the optical circuit of the present invention, the positions of the input/output of the grating couplers are designed to be arranged together on adjacent locations at an interval adapted to the configuration of the end portions of the optical probe. The arrangement of the two of the pair of grating couplers 4102 as in the present embodiment allows stable and accurate flaw detection judgment using a single optical probe.

Figure 14:
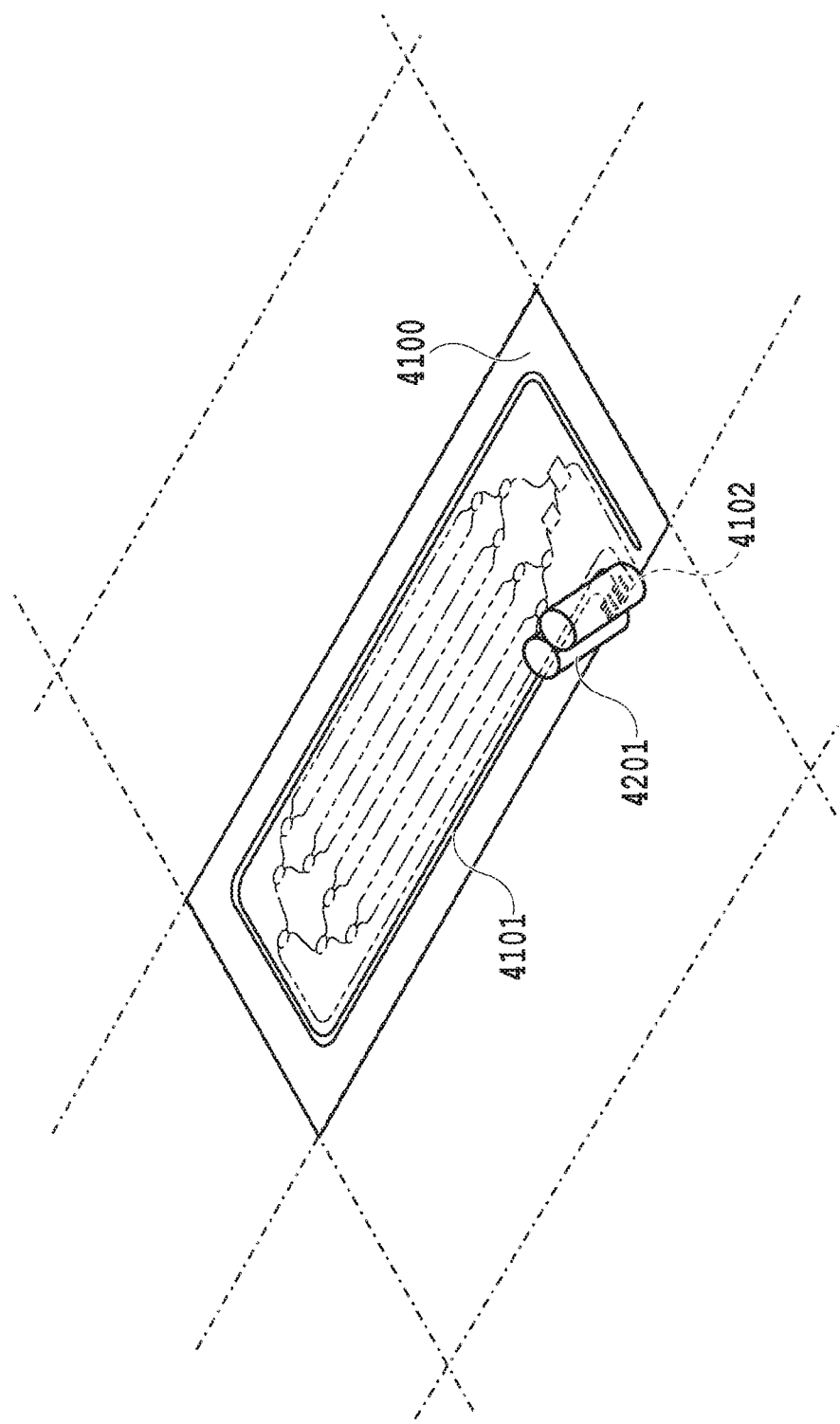
FIG. 14 is a diagram illustrating a method of an optical circuit inspection during a process using the optical circuit of the fourth embodiment of the present invention.

FIG. 14 is a diagram illustrating a method of an optical circuit inspection during a process using the optical circuit of the fourth embodiment of the present invention. The pair of grating couplers 4102 which are light input/output mechanisms adjacently arranged together is employed to schematically show a method of measuring the light transmittance characteristic of the optical waveguide 4101 in the state of a wafer.

In FIG. 14, the optical modulation circuit of FIG. 13 which is a target circuit is shown in one rectangular area defined with dotted lines, and each of a plurality of rectangular areas is aligned on the wafer in the state before being cut out into one chip. Above the pair of grating couplers 4102 arranged in parallel for the optical circuit of the present invention, optical probes 4201 in which optical fibers are fixed in parallel at a certain interval are disposed proximate to each other for the optical coupling. When connecting one optical fiber of the optical probes 4201 to the light source for measurement and the other optical fiber to a detector, light transmittance characteristics of the optical circuit for inspection can be evaluated as in the case of inputting/outputting light to/from the end face of the substrate after being cut and separated into a chip as in the conventional technique, and further, as in the descriptions regarding the first embodiment in FIG. 4.

A pitch between two optical fibers of the optical probes 4201, that is, an interval between the pair of grating couplers 4102 depends on the design of an inspection device, but in consideration of the covering diameter of the optical fiber, they should desirably be located as close as possible in terms of positional accuracy. Here, the pitch between the two optical fibers for the optical probes 4201 refers to a distance between the centers of the cores of the two optical fibers, and the interval between the pair of grating couplers 4102 refers to a distance between the centers of the two rectangular grating couplers.

Figure 15:
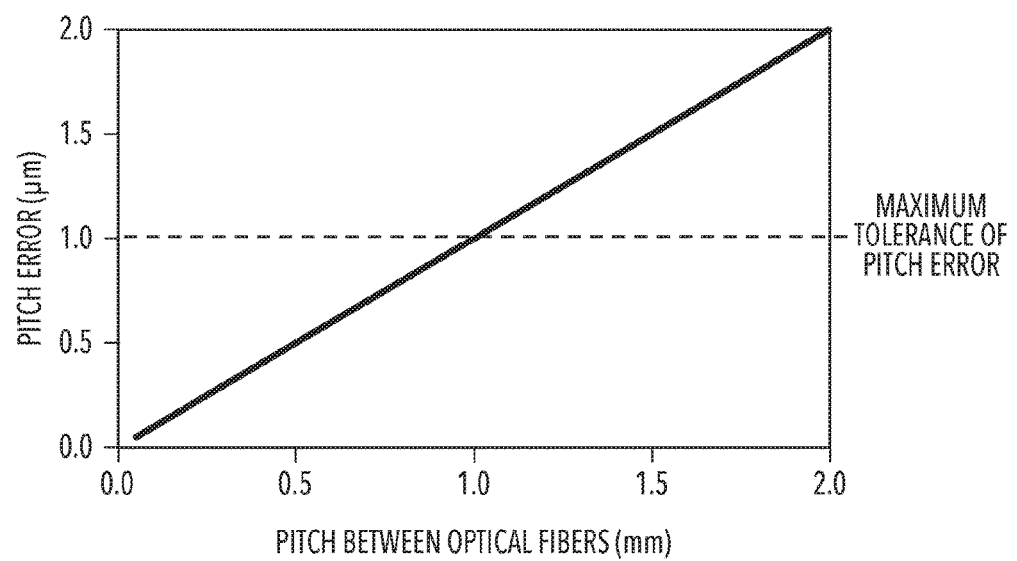
FIG. 15 is a graph showing a nominal value of a pitch between fibers and an error amount of an actually measured pitch in optical fiber block components.

FIG. 15 is a graph showing, in optical fiber block components to which two optical fibers are fixed, a nominal value of a pitch between fibers and an error amount of a pitch between actually fabricated ones. In the optical fiber block components to which two optical fibers are fixed at a specific pitch, a pitch between the actually fabricated optical fiber block components is deviated from a design value, that is, a nominal value of a pitch between the optical fibers, and has variations. In FIG. 15, a horizontal axis indicates nominal values and a vertical axis indicates errors of actually fabricated pitches from nominal values. Normally, since the mode field diameter of light in the optical fiber is approximately 10 μm, a positional deviation between the grating coupler and the optical fiber is required to be 0.5 μm or less for making good optical coupling. At this time, a pitch error allowed between the two optical fibers is 1 μm, and as shown in FIG. 15, it is appropriate that a pitch between the two optical fibers be 1 mm at most.

In the present embodiment, a method of detecting a flaw on the optical circuit using light transmittance characteristics obtained from the inspection during the manufacturing process of the optical circuit is completely identical to those of the above embodiments, and thus, its explanation will be omitted.

As described above, according to the optical circuit of the present embodiment, a flaw occurred in the manufacturing process of the silicon optical circuit on a wafer can be objectively detected in an earlier stage in the inspection in the state of a wafer. In the present embodiment, by making optical coupling of the grating couplers more stable using a single optical probe, the detection and judgment of a flaw on the optical circuit can be achieved more stably and accurately compared to those in the first to fourth embodiments.

Fifth Embodiment

Figure 16:
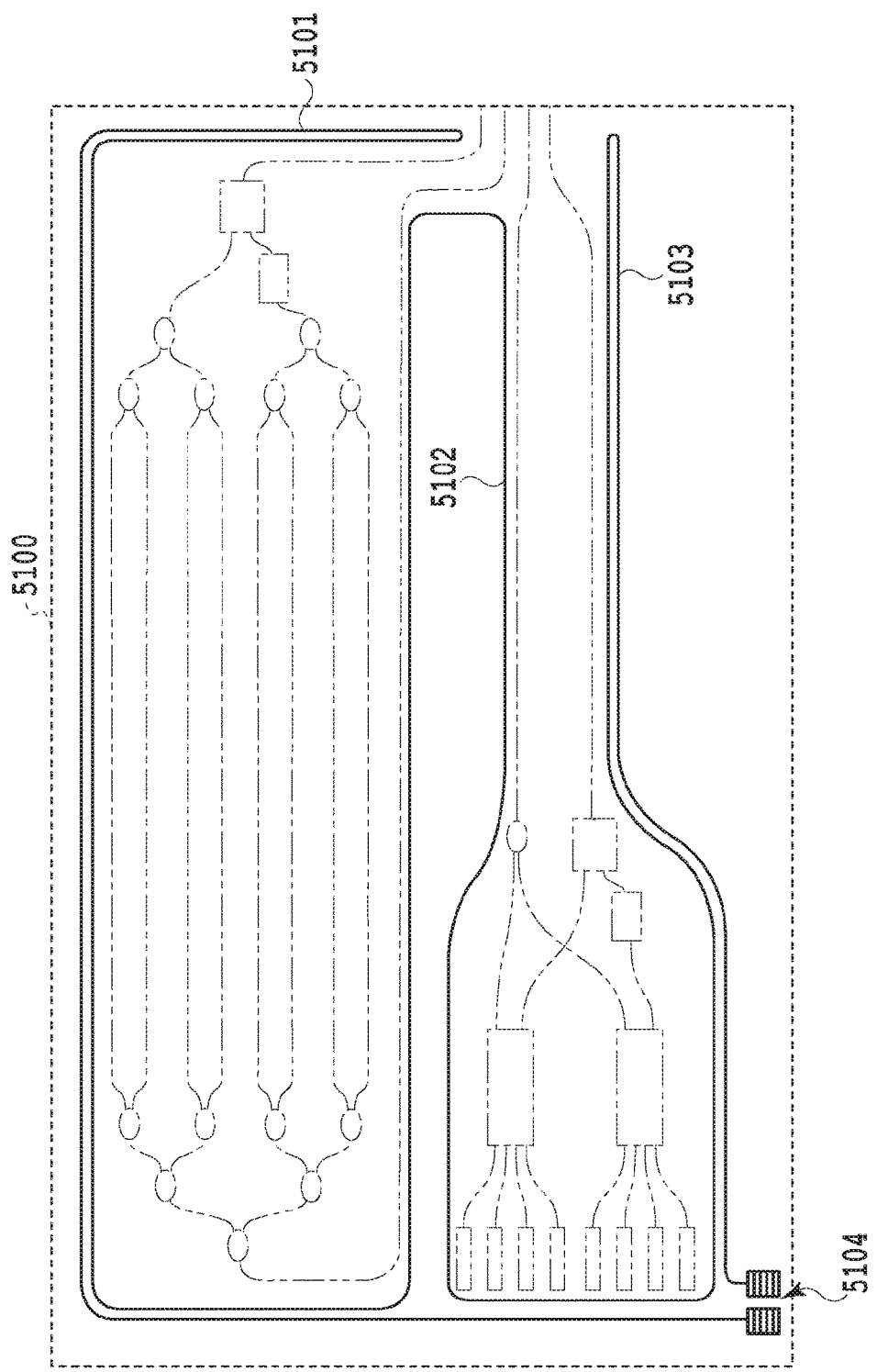
FIG. 16 is a plan view showing a configuration of an optical circuit according to a fifth embodiment of the present invention.

FIG. 16 is a plan view showing a configuration of an optical circuit according to the fifth embodiment of the present invention. In FIG. 16, a rectangular area defined by dotted lines shows a silicon optical circuit chip 5100, which is composed of a circuit completely identical to integrated circuits of an optical modulator and receiver of a conventional technique as illustrated in FIG. 28. The silicon optical circuit chip 5100 is also one chip area on a silicon wafer, and further is a single optical circuit chip when being cut into chips from the wafer. In FIG. 16, the optical modulator and receiver having a configuration identical to the conventional technique is shown with dotted lines, and an explanation on a configuration and operation will be omitted. The optical modulator and receiver shown with the dotted lines in FIG. 16 is a target circuit for implementing a predetermined function which is to be a target of flaw detection.

The optical circuit of the present embodiment includes, in addition to the optical modulator and receiver which are target circuits depicted with the dotted lines in FIG. 16, an optical circuit for inspection depicted with a solid line. The optical circuit for inspection is composed of an optical waveguide 5101, 5102, 5103 and a pair of grating couplers 5104 connected to both ends of the optical waveguides 5101, 5103. A configuration of each of the pair of grating couplers 5104 is identical to those of the first to fourth embodiments, and further, the two grating couplers are proximately arranged together as in the fourth embodiment.

In the present embodiment, as in the second to fourth embodiments, the optical waveguide is arranged so as to surround the target circuit, and particularly, since the target circuit is an integrated circuit made of a plurality of sub target circuits (optical modulator and receiver), the optical waveguide having a plurality of loopback portions 5101, 5102, 5103 is arranged so as to surround each of the sub target circuits. When a target circuit in an area to be cut out into one chip has at least two circuit portions having different functions, the sub target circuits refer to such circuit portions. Since the sub target circuits have different functions, it is possible to arrange them apart from each other on the chip, and, as the case may be, it is even preferable to arrange them apart from each other. In the case of including two or more sub target circuits as in the present embodiment, an optical waveguide for detection 5102 can be arranged so as to surround the contour of each of the sub target circuits by extending over both of the two sub target circuits through a space between the two sub target circuits.

In the present embodiment, the optical waveguide for detection is composed of three waveguide portions, that is, a first one is a loopback waveguide portion arranged along the upper side of the contour of an optical modulator circuit (first sub target circuit), a second one is a waveguide portion 5102 between the above-described two sub target circuits, and a third one is a loopback waveguide portion 5103 arranged along the lower side of the contour of the receiver (second sub target circuit). The actual optical waveguide for detection of FIG. 16 in the present embodiment is an integrated optical waveguide in which the three waveguide portions 5101, 5102, 5103 of the arranged optical waveguide are arranged continuously in series, and thus, there is no need to fabricate a different waveguide separately and make them connect to each other. At both ends of the integrated optical waveguide composed of the three waveguide portions 5101, 5102, 5103 of the optical waveguide, the two of the pair of grating couplers 5104 are provided.

The configuration of the present embodiment is also applicable similarly to the case of three or more sub target circuits. In other words, the optical waveguide for detection may at least include a loopback waveguide portion arranged along a portion of the contour of the sub target circuit located on the end part within the chip and a waveguide portion between the sub target circuits arranged along the contour of those sub target circuits by extending over two or more different sub target circuits. A manner of configuring the integrated optical waveguide as to in what order and in what way the loopback waveguide portion and the waveguide portion between the sub target circuits are to be arranged can be selected in variety in accordance with the configuration and arrangement of the sub target circuits, and the present invention is not limited at all to the configuration of FIG. 16. As in the present embodiment, by configuring the loopback optical waveguide portion and the waveguide portion between the sub target circuits to surround the respective contours of the plurality of sub target circuits, the accuracy of flaw detection can be increased even with a small flaw occurred only on part of the sub target circuit area of a target circuit inside a chip.

Therefore, the optical circuit of the present embodiment can be carried out, in which the target circuit includes at least two sub target circuits having an identical function or different functions, the optical waveguide for detection at least includes: loopback waveguide portions 5101, 5103 having an outward portion arranged along a contour of a first sub target circuit from one coupler of a pair of grating couplers so as to surround the first sub target circuit and a return portion arranged by returning substantially parallel to the outward portion; and a waveguide portion 5102 between the sub target circuits arranged continuously from the loopback waveguide portion of the first sub target circuit along part of a contour that is not surrounded by the loopback waveguide portion of the contour of the first sub target circuit or along at least part of a contour of a second sub target circuit that is different from the first sub target circuit, and the pair of grating couplers are formed proximate and parallel to each other such that their incident angles face the same direction at the time of coupling to fiber components.

In the present embodiment, the optical modulator and receiver having different functions have been shown as examples of two sub target circuits included in a chip of a target circuit, but it is needless to say that the present embodiment can also be applied to a case where a plurality of sub target circuits having the same function are included in one chip. In other words, in a case where the plurality of sub target circuits having the same function are arranged apart from each other, a flaw occurred within a chip can be detected by the waveguide portion 5102 between the sub target circuits as shown in FIG. 16.

In the present embodiment as well, as in the third embodiment and fourth embodiment, the core widths of the linear portions of the optical waveguide 5101, 5102, 5103 are enlarged to form a multimode waveguide so as to reduce the propagation loss. The core widths of curved portions of the optical waveguide 5101, 5102, 5103 are 0.5 μm and the core widths of linear portions are 1.5 μm. A portion connecting the linear portion and other portions has a continuously transformed core width as a tapered waveguide, and the length of each tapered waveguide is 15 μm.

As in the above first to fourth embodiments, it is desirable that the optical waveguide 5101, 5102, 5103 be arranged as close as possible to the outermost contour of the waveguide for each of the sub target circuits in the target circuit within a range in which light coupling does not occur. The appropriate adjacent interval between the waveguide of the target circuit and the optical waveguide for detection is 50 μm at most.

Further, in the present embodiment, the two grating couplers are adjacently arranged together in the vicinity of one corner location of a rectangular chip area as in the fourth embodiment. The grating couplers are configured to achieve optical coupling more stably using a single optical probe. An interval between the pair of grating couplers 5104 depends on the design of an inspection device, but in consideration of the covering diameter of the optical fiber, they should desirably be located as close as possible in terms of positional accuracy, and it is appropriate to have the interval of 1 mm at most.

In the present embodiment as well, a method of detecting a flaw on the optical circuit using light transmittance characteristics obtained from the inspection during the manufacturing process of the optical circuit is completely identical to those of the above embodiments, and thus, its explanation will be omitted.

As described above, according to the present embodiment, a flaw occurred in the manufacturing process of the silicon optical circuit on a wafer can be objectively detected in an earlier stage in the inspection in the state of a wafer. Further, in the case where a plurality of sub target circuits exist within a chip, the present invention can also be applied to a more complicated large-scale optical circuit than the optical circuit including only the single target circuit by using an integrated optical waveguide for detection in which the loopback waveguide surrounding respective sub target circuits is sequentially connected in series.

Sixth Embodiment

Figure 17:
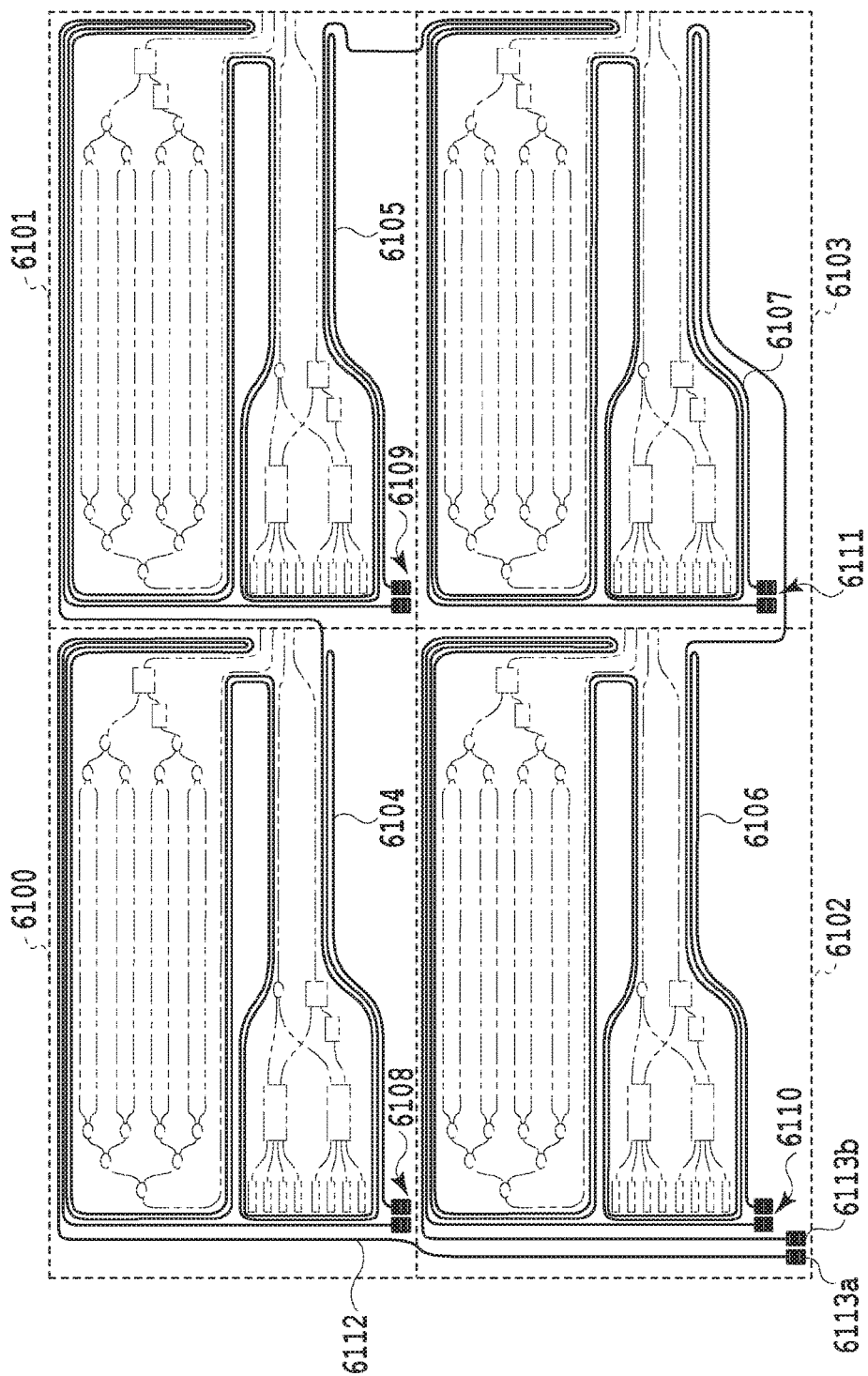
FIG. 17 is a plan view showing a configuration of an optical circuit according to a sixth embodiment of the present invention.

FIG. 17 is a plan view showing a configuration of an optical circuit according to the sixth embodiment of the present invention. The optical circuits of the present invention in the above first to fifth embodiments are configured to detect a flaw occurred on the optical circuit by each chip area that includes a target circuit to be cut out into individual chips afterwards. The present embodiment presents a circuit configuration capable of detecting a flaw by simultaneously inspecting a plurality of target circuits arranged on a wafer and a method thereof so as to enable efficient flaw detection over a plurality of chips.

In FIG. 17, rectangular areas defined with dotted lines show silicon optical circuit chips 6100 to 6103, respectively, and are composed of circuits completely identical to the integrated circuits of an optical modulator and receiver of a conventional technique described in FIG. 28. Each of the silicon optical circuit chips 6100 to 6103 is also one chip area on a silicon wafer, and in the case of cutting the wafer into a chip, it becomes a single silicon optical circuit chip. In FIG. 17, optical modulators and receivers having configurations identical to those of conventional techniques are shown with dotted lines, and explanations of their configurations and operations will be omitted. The optical modulators and receivers shown with the dotted lines within the respective rectangular areas in FIG. 17 are target circuits for implementing a certain function to be a target of flaw detection.

The optical circuits of the present embodiment include, in addition to the optical modulators and receivers which are target circuits depicted with the dotted lines in FIG. 17, optical circuits for inspection depicted with solid lines. The optical circuit for inspection is, in a chip area 6100, composed of an optical waveguide 6104 arranged so as to surround the target circuit and a pair of grating couplers 6108 connected to both ends of the optical waveguide 6104. Further, in a chip area 6101, an optical waveguide 6105 arranged so as to surround a target circuit and a pair of grating couplers 6109 connected to both ends of the optical waveguide 6105 are provided. Similarly, in a chip area 6102, an optical waveguide 6106 arranged so as to surround a target circuit and a pair of grating couplers 6110 connected to both ends of the optical waveguide 6106 are provided, and further, in a chip area 6103, an optical waveguide 6107 arranged so as to surround a target circuit and a pair of grating couplers 6111 connected to both ends of the optical waveguide 6107 are provided.

The above-described configuration of the optical circuit for inspection in each chip is identical to that of the fifth embodiment shown in FIG. 16. The present embodiment has features in which four optical waveguides 6104 to 6107 in respective chip areas are further arranged therealong and in which one common optical waveguide for detection 6112 connected in series is disposed so as to surround four chips in the order of the optical waveguide 6104, the optical waveguide 6105, the optical waveguide 6107, and the optical waveguide 6106. To both ends of the common optical waveguide for detection 6112, a pair of grating couplers 6113a, 6113b are connected. A configuration of each of the pair of grating couplers 6108, 6109, 6110, and 6111 is identical to those of the embodiments described above.

Therefore, the present embodiment includes the four individual optical waveguides for detection arranged so as to surround the four target circuits, respectively, and, in addition to the above, one common optical waveguide for detection arranged along each of the four target circuits in sequence. The present embodiment is configured to measure transmission spectra or an insertion loss by using the optical probes via the pair of grating couplers for each of the optical waveguides for detection.

In the present embodiment, since the target circuit within each chip is an integrated circuit made of a plurality of sub target circuits as in the fifth embodiment, an integrated optical waveguide in which a loopback optical waveguide portion surrounding each of the sub target circuits within one chip and a waveguide portion between the sub target circuits are arranged in series and grating couplers disposed at both ends thereof are configured. Due to this, the accuracy of flaw detection can be increased even with a small flaw occurred only on part of the sub target circuit area of the integrated target circuit.

Furthermore, as in the third embodiment, fourth embodiment, and fifth embodiment, the core widths of the linear portions of the optical waveguides are enlarged to form multimode waveguides so as to reduce the propagation loss in the optical waveguides. The core widths of curved portions of the optical waveguides are 0.5 µm and the core widths of linear portions are 1.5 µm. Portions connecting the linear portions and other portions have continuously transformed core widths as tapered waveguides, and the length of each tapered waveguide is 15 µm.

Further, in the present embodiment as well, it is desirable that, as in all the embodiments described above, each optical waveguide be arranged as close as possible to the outermost contour of each of the sub target circuits in the target circuit within a range in which light coupling does not occur. Each appropriate adjacent interval between the waveguide of the target circuit and the optical waveguide for detection is 50 µm at most.

Moreover, in the present embodiment, as in the fourth embodiment and fifth embodiment, in the pair of grating couplers 6108, 6109, 6110, and 6111, two grating couplers are adjacently arranged together in the vicinity of one corner of each rectangular area of a chip area. The pair of grating couplers 6113a, 6113b for the common optical waveguide for detection 6112 is arranged at a corner of the chip area 6102 in FIG. 17, but may be arranged on any chip within the four chip areas. All of the pair of grating couplers are configured to achieve optical coupling more stably with respective single optical probes. An interval between the two grating couplers depends on the design of an inspection device, but in consideration of the covering diameter of the optical fiber, they should desirably be located as close as possible in terms of positional accuracy, and it is appropriate to have the interval of 1 mm at most.

Next, in the optical circuits of the present embodiment, a method of detecting a flaw more efficiently on the optical circuits using light transmittance characteristics obtained from the inspection during the manufacturing process of the optical circuits will be explained. In the above first to fifth embodiments, the detection and judgment of a flaw on the optical circuits are made separately for individual chip area at a time. In contrast, in the present embodiment, the detection and judgment of a flaw on the optical circuits are made for a plurality of chip areas, and, as required, the detection and judgment of a flaw on the optical circuits are made separately one by one for the individual chip areas. In other words, hierarchical flaw detection and judgment which is composed of the flaw detection and judgment using the common optical waveguide for detection and the flaw detection and judgment using individual optical waveguides for detection are made.

Figure 18:
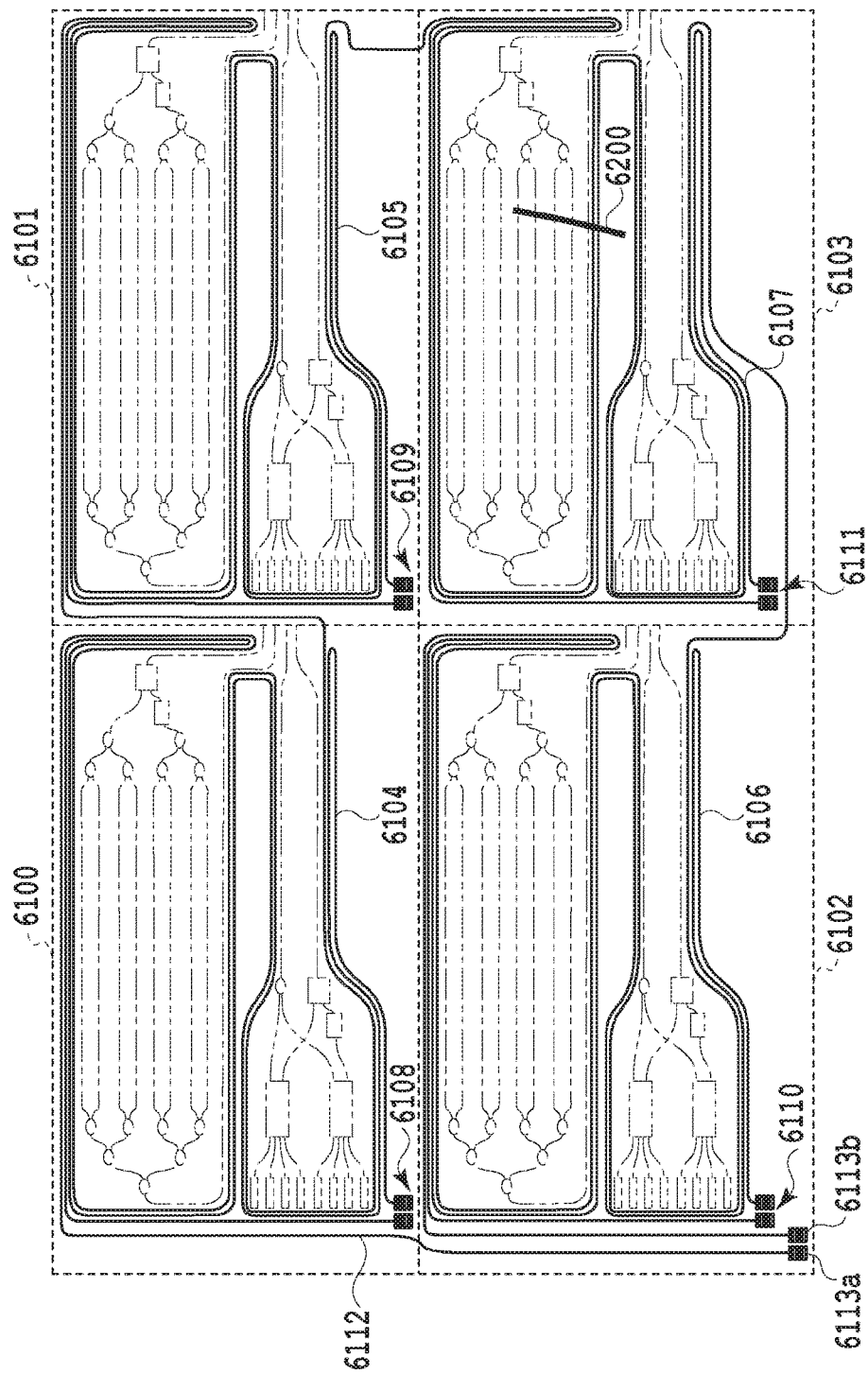
FIG. 18 is a diagram showing a state in which a scratch has occurred on one optical circuit among target circuits during the manufacturing process according to the optical circuits of the sixth embodiment.

FIG. 18 is a diagram showing a state in which a scratch has occurred on one optical circuit among target circuits during the manufacturing process according to the optical circuits of the sixth embodiment. In the optical circuits of the present embodiment shown in FIG. 17, an example in which a flaw 6200 occurs on part (optical modulation circuit) of a target circuit in a chip area 6103 during the manufacturing process of the optical circuits is illustrated. Here, by simply depicting the common optical waveguide for detection 6112 and the individual optical waveguides for detection 6104 to 6107 of the present embodiment shown in FIG. 17, hierarchized flaw detection and judgment may be understood more easily.

Figure 19:
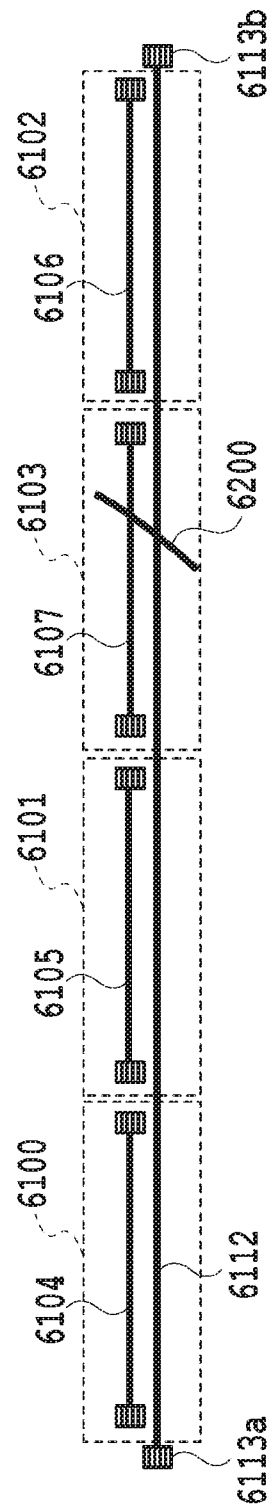
FIG. 19 is a diagram schematically showing a hierarchical configuration of the optical waveguide for detection according to the optical circuits of the sixth embodiment of the present invention.

FIG. 19 is a diagram schematically showing a hierarchical configuration of the optical waveguides for detection according to the optical circuits of the sixth embodiment of the present invention. This diagram corresponds to the state of a flaw shown in FIG. 18, and illustrates an example in which the flaw 6200 occurs on part (optical modulation circuit) of the target circuit in the chip area 6103. The individual optical waveguides for detection 6104 to 6107 each exists only in one corresponding chip area so as to detect only a flaw occurred on the optical circuit within one corresponding chip area. In contrast, the common optical waveguide for detection 6112 is one optical waveguide configured to extend over the four chips, and if a flaw exists in one of the optical circuits within the four chip areas, this can be detected. On the other hand, if no flaw is judged to exist in the common optical waveguide for detection 6112, single inspection using one optical waveguide for detection 6112 allows simultaneous confirmation that no flaw exists within the four chip areas.

In the optical circuits of the present embodiment, flaw detection in the optical circuits is made in the following steps. As a first measurement, the transmission spectrum of the common optical waveguide 6112 arranged so as to continuously surround the four target circuits is measured via the pair of grating couplers 6113*a*, 6113*b*. In a case where a flaw occurs on any of the four target circuits, a great loss arises in the flaw (defect) occurred on the common optical waveguide 6112, and thus, such a loss is also reflected on the transmission spectrum measured by the common optical waveguide 6112.

Figure 20:
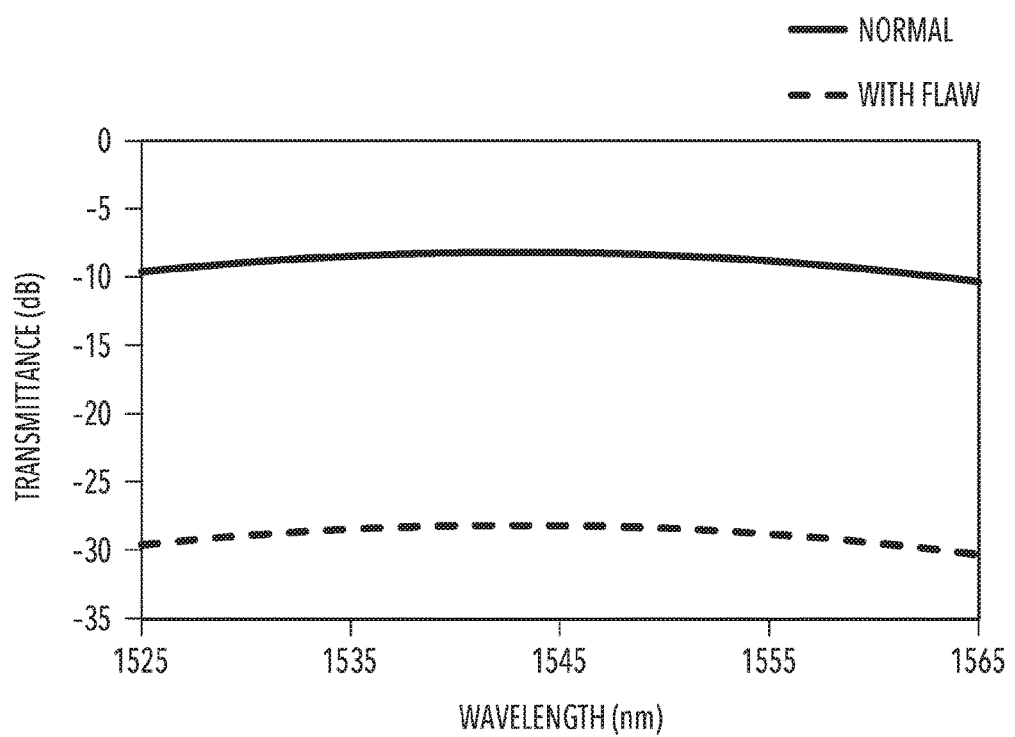
FIG. 20 is a graph showing transmission spectra obtained in cases with/without a flaw according to the optical circuits of the sixth embodiment.

FIG. 20 is a graph showing transmission spectra obtained in cases with/without a flaw according to the optical circuits of the sixth embodiment. In the case where the flaw 6200 occurs in one of the target circuits as shown in FIG. 18, the transmission spectrum of "with flaw" is obtained in FIG. 20. Meanwhile, in the case where no flaw exists in any of the four target circuits as shown in FIG. 17, the transmission spectrum of "normal" is obtained in FIG. 20. In the case where the "normal" transmission spectrum is obtained in the first measurement and no flaw is detected in the common optical waveguide 6112, the four target circuits are judged to have no flaw at all, and the inspection during the manufacturing process for these four chip areas is judged as passed, thereby completing the flaw detection and judgment and then advancing to the process of other subsequent four chip areas.

In the case where the "with flaw" transmission spectrum is obtained in the first measurement and a flaw is judged to exist, the process advances to a second measurement. In the second measurement, the transmission spectra of the individual optical waveguides 6104 to 6107 which are arranged so as to only surround respective four target circuits are measured via the respective pair of grating couplers 6108 to 6111.

Figure 21:
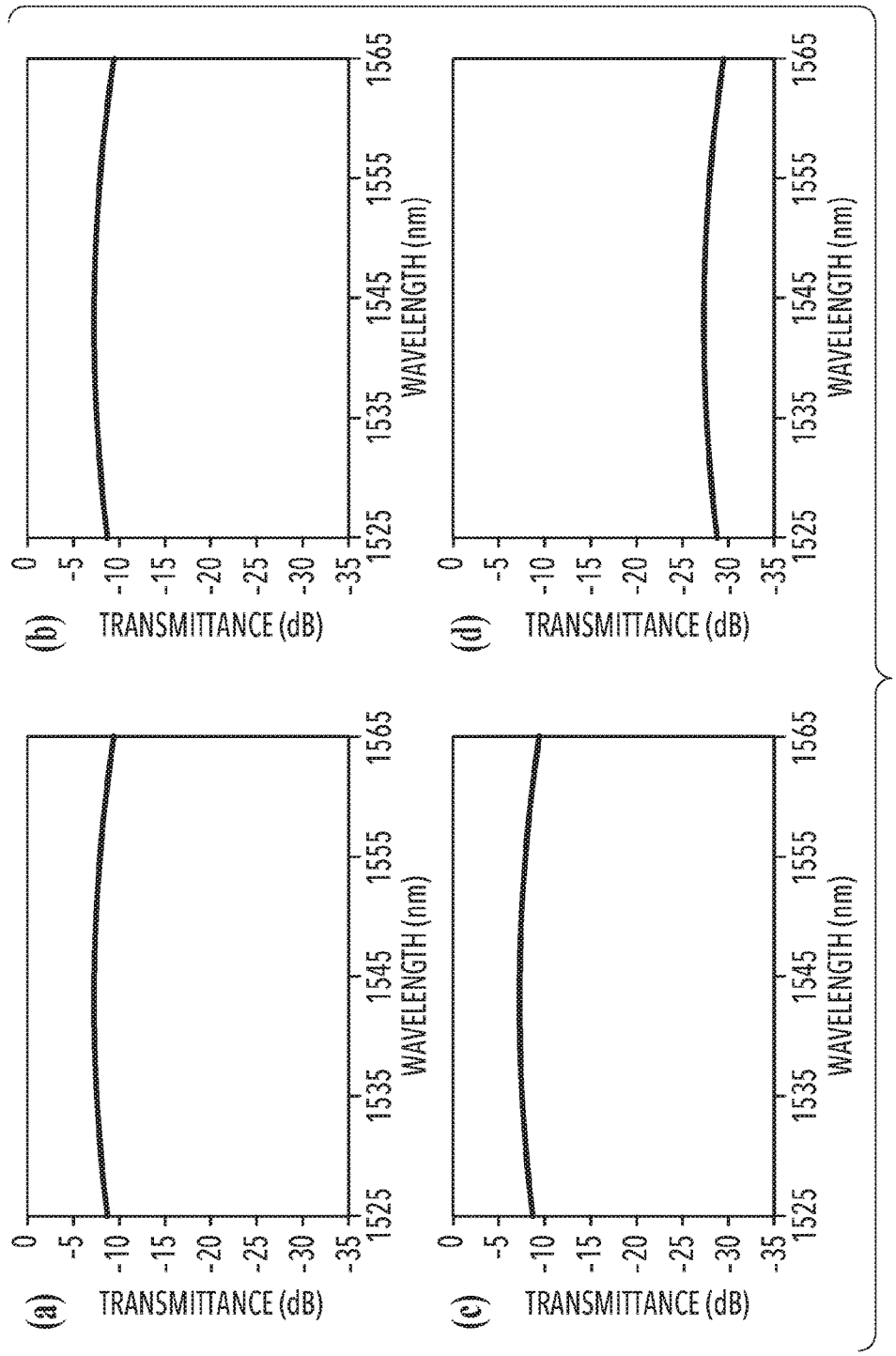
FIG. 21 is a graph showing a transmission spectrum in each of four measured target circuits in a second measurement according to the sixth embodiment.

FIG. 21 is a graph showing transmission spectra in four measured target circuits in the second measurement according to the sixth embodiment. FIG. 21(*a*) is a spectrum measured by the pair of grating couplers 6108 in the chip area 6100 including a target circuit, and similarly, FIG. 21(*b*) shows a spectrum measured by the pair of grating couplers 6109 in the chip area 6101, FIG. 21(*c*) shows a spectrum measured by the pair of grating couplers 6110 in the chip area 6102, and FIG. 21(*d*) shows a spectrum measured by the pair of grating couplers 6111 in the chip area 6103. In the case where the flaw 6200 occurs on the single chip area 6103 of the target circuit as shown in FIG. 18, a great loss is found on the transmission spectrum of the optical waveguide that corresponds to the target circuit having the flaw as in FIG. 21(*d*). By performing the second measurement, the target circuit having the flaw can be specified and detected. If it is possible to presume that a flaw exists in one location among the four target circuits based on a transmission loss value obtained in the first measurement, there is no need to perform the second measurement to all the four target circuits. It is also possible to stop the second measurement at a stage in which the target circuit having the flaw is discovered. For instance, in the case where the flaw is judged to exist on one location in the first measurement and the flaw is specified by an initial measurement of the target circuit in the second measurement, it is possible to omit inspection on the subsequent three remaining target circuits. As a result, flaw inspection for the four target circuits only requires two measurements.

Normally, it is a rare phenomenon that a flaw occurs on the optical circuits in which a plurality of chip areas are arranged within a wafer, and its frequency is in the level of being detected on several circuits per wafer or not being detected at all. Under such frequency of occurrence, in most of the cases, no flaw is judged to exist in the first measurement in the present embodiment, and as in the first to fifth embodiments, the number of measurements can be reduced by about one quarter compared to the case of detecting a flaw by measuring the individual optical waveguides for detection arranged along the contour of the target circuit for each of all the chip areas.

As in the present embodiment, the hierarchical detection method by combining the measurement of the common optical waveguide for detection and the measurement of the individual optical waveguides for detection allows significant reduction in inspection time for detecting a flaw occurred on the optical circuit to realize efficient manufacturing and testing processes. In the above explanations of the present embodiment, the common optical waveguide for detection 6112 is configured to extend over the four chip areas, the number of chip areas through which the common optical waveguide for detection passes can be appropriately changed according to the scale of an optical circuit within one chip or the size of a chip. Therefore, when increasing the number of chip areas through which the common optical waveguide for detection passes, the number of target circuits for detecting a flaw by the first measurement will be increased. If a manufacturing process has less frequency of flaw occurrence, the number of measurements required for one wafer can be reduced in inverse proportion to the number of chip areas.

As described above, according to the present embodiment, a flaw occurred during the manufacturing process of the silicon optical circuit on the wafer can be objectively detected in an earlier stage in the inspection in the state of a wafer. By making hierarchical inspection using the common optical waveguide for detection which is formed over the plurality of target circuits and the individual optical waveguides for detection, the number of measurements of transmission spectra can be significantly reduced to realize flaw detection process with enhanced efficiency.

Seventh Embodiment

Figure 22:
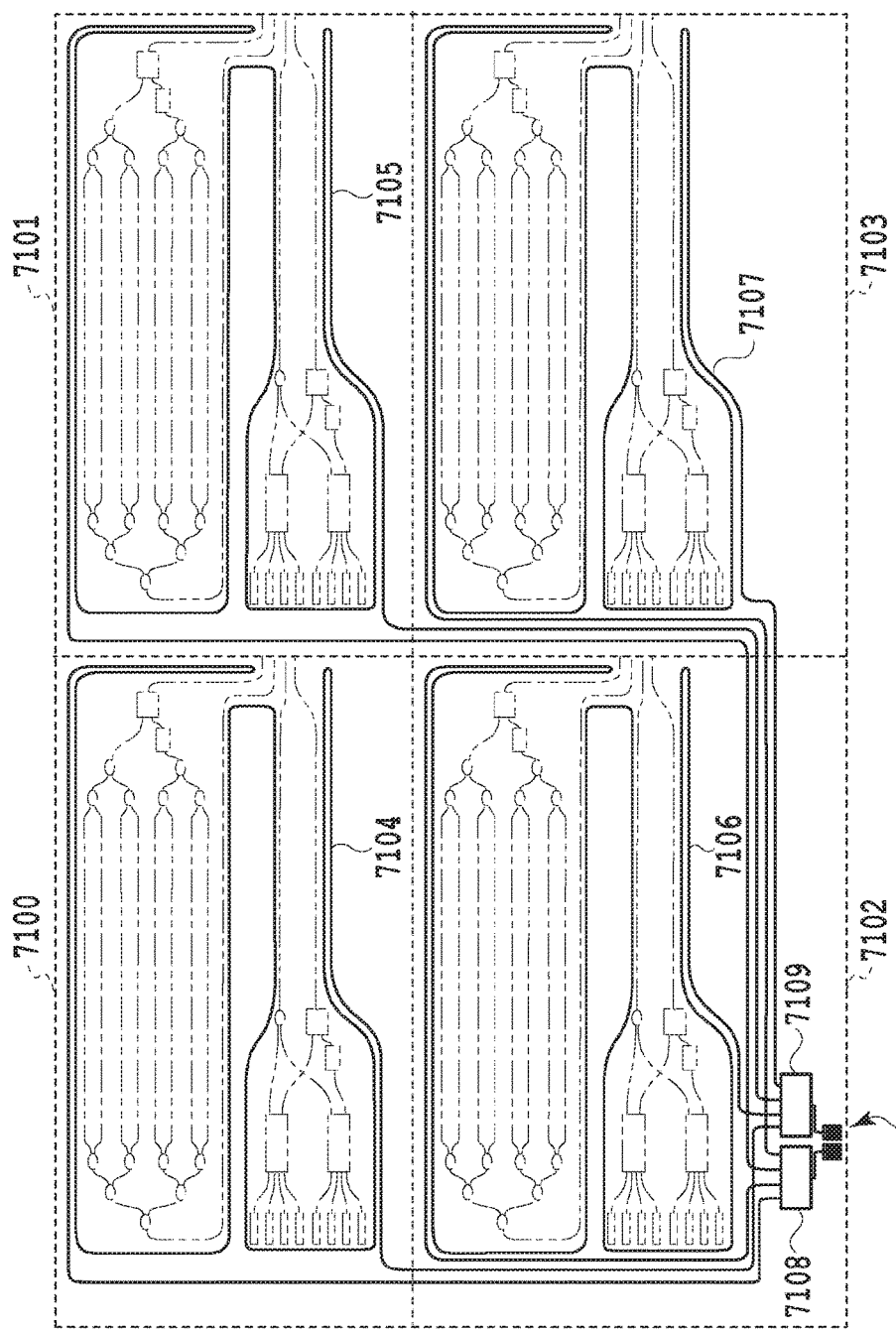
FIG. 22 is a plan view showing a configuration of optical circuits according to a seventh embodiment of the present invention.

FIG. 22 is a plan view showing a configuration of optical circuits according to the seventh embodiment of the present invention. In the present embodiment as well, a circuit configuration capable of detecting a flaw with fewer measurements by simultaneously inspecting a plurality of target circuits arranged on a wafer and a method thereof so as to enable efficient flaw detection over a plurality of chips. In the present embodiment, by including optical circuits for inspection in which wavelength bands to acquire transmission spectra are divided by each target circuit, the number of coupling locations to the grating couplers is reduced and the number of measurements for flaw detection is significantly reduced to further enhance efficiency of the flaw detection and judgment process for a wafer.

In FIG. 22, rectangular areas defined with dotted lines show silicon optical circuit chips 7100 to 7103, respectively, and are composed of circuits completely identical to the integrated circuit of an optical modulator and receiver of a conventional technique described in FIG. 28. Each of the silicon optical circuit chips 7100 to 7103 is also one chip area on a silicon wafer, and in the case of cutting the wafer into a chip, it becomes a single silicon optical circuit chip. In FIG. 22, optical modulators and receivers having configurations identical to those of conventional techniques are shown with dotted lines, and explanations of their configurations and operations will be omitted. The optical modulators and receivers shown with the dotted lines within the respective rectangular areas in FIG. 22 are target circuits for implementing a certain function to be a target of flaw detection.

The optical circuit of the present embodiment includes, in addition to the optical modulators and receivers which are target circuits depicted with the dotted lines in FIG. 22, optical circuits for inspection depicted with solid lines. As individual optical circuits for inspection for respective four chip areas, a chip area 7100 includes an optical waveguide 7104 which is arranged to surround a target circuit, a chip area 7101 includes an optical waveguide 7105 which is arranged to surround a target circuit, a chip area 7102 includes an optical waveguide 7106 which is arranged to surround a target circuit, and a chip area 7103 includes an optical waveguide 7107 which is arranged to surround a target circuit. In the present embodiment, the optical circuits for inspection further include wavelength multiplex/demultiplex circuits 7108, 7109 having a function of branching light into four outputs according to wavelengths. The optical waveguides 7104 to 7107 for inspection are each arranged such that its one end is connected to one output of a first wavelength multiplex/demultiplex circuit 7108 and the other end is connected to one output of a second wavelength multiplex/demultiplex circuit 7109. One input of the first wavelength multiplex/demultiplex circuit 7108 and one input of the second wavelength multiplex/demultiplex circuit 7109 are connected to a pair of grating couplers 7110, respectively. A configuration of the pair of grating couplers 7110 is identical to that of each of the above embodiments.

In the circuits for inspection of the present embodiment of FIG. 22, the four optical waveguides 7104 to 7107 which are arranged so as to surround respective contours of the target circuits within the four chip areas are configured so as to be branched from and merged into the two wavelength multiplex/demultiplex circuits 7108, 7109 and so that transmission spectra can be measured with optical probes via the single pair of grating couplers 7110. This is contrastive to the case of the sixth embodiment shown in FIG. 17 in which the chip areas include individual pairs of grating couplers 6108 to 6111, respectively.

Further, in the present embodiment, each of the target circuits is an integrated circuit made of a plurality of sub target circuits as in the fifth embodiment and sixth embodiment. Due to this, the integrated optical waveguides 7104 to 7107 in which, in each of the target circuits, a loopback optical waveguide portion surrounding each sub target circuit and a waveguide portion between the sub target circuits are arranged in series are configured. In the present embodiment, the four optical waveguides 7104 to 7107 are configured to be connected to the two wavelength multiplex/demultiplex circuits 7108, 7109, and are connected to the single pair of grating couplers 7110 via the two wavelength multiplex/demultiplex circuits. Due to the configuration of the present embodiment, even a small flaw occurred only on part of the sub target circuit area of the integrated circuit within each chip area can be detected with higher accuracy, and at the same time, the number of pair of grating couplers required is only one.

In the present embodiment as well, as in the third embodiment, fourth embodiment, and fifth embodiment, the core widths of the linear portions of the optical waveguides are enlarged to form multimode waveguides so as to reduce the propagation loss. The core widths of curved portions of the optical waveguides are 0.5 μm and the core widths of linear portions are 1.5 μm. Portions connecting the linear portions and other portions have continuously transformed core widths as tapered waveguides, and the length of each tapered waveguide is 15 μm.

As in the above first to sixth embodiments, it is desirable that, the optical waveguides 7104 to 7107 be arranged as close as possible to the outermost contour of the waveguide for each of the sub target circuits in the target circuit within a range in which light coupling does not occur. The appropriate adjacent interval between the waveguide of the target circuit and the optical waveguide for detection is 50 μm at most.

Figure 23:
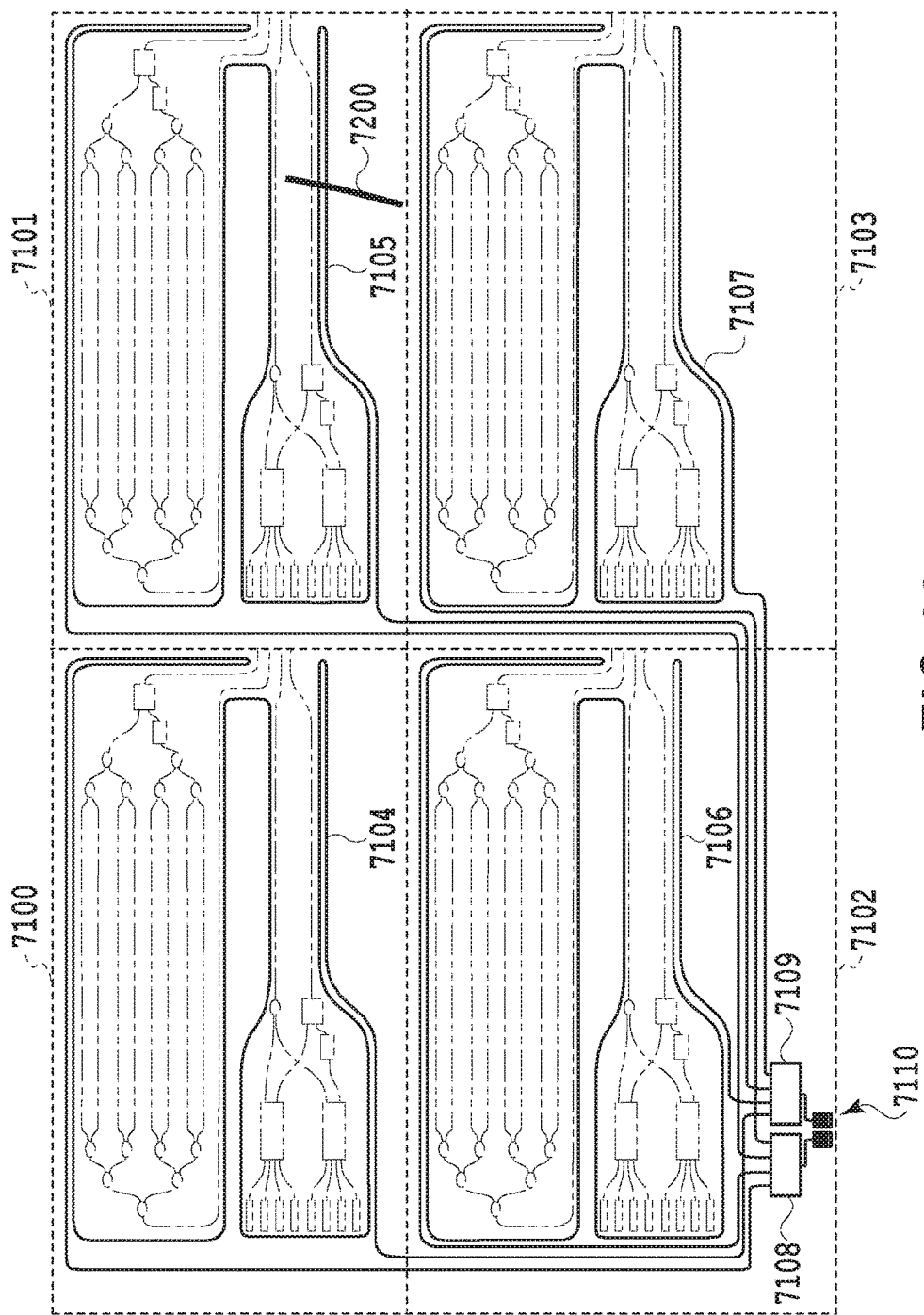
FIG. 23 is a diagram showing a state in which a scratch has occurred on one optical circuit among target circuits in the manufacturing process according to the optical circuits of the seventh embodiment.

Moreover, in the present embodiment, as in the fourth embodiment and fifth embodiment, the pair of grating couplers 7110, that is, the two grating couplers are adjacently arranged together in the vicinity of one corner of the rectangular chip area 7102. In FIG. 23, the pair of grating couplers 7110 and the two wavelength multiplex/demultiplex circuits 7108, 7109 are arranged on the lower left part of the chip area 7102, but they may be located anywhere within the four chip areas. The pair of grating couplers is configured to achieve optical coupling more stably with a single optical probe. An interval between the two grating couplers depends on the design of an inspection device, but in consideration of the covering diameter of the optical fiber, they should desirably be located as close as possible in terms of positional accuracy, and it is appropriate to have the interval of 1 mm at most.

Next, in the optical circuits of the present embodiment, a method of detecting a flaw on the optical circuit more efficiently using light transmission spectra obtained by the inspection of the optical circuits will be explained. In the above first to fifth embodiments, the detection and judgment of a flaw on the optical circuits are made separately for individual chip area at a time. In contrast, in the present embodiment, the detection and judgment of a flaw on the optical circuits are simultaneously made by supplying test lights which have been wavelength branched via the two wavelength multiplex/demultiplex circuits 7108, 7109 to the four optical waveguides 7104 to 7107.

FIG. 23 is a diagram showing a state in which a scratch has occurred on one optical circuit among target circuits during the manufacturing process according to the optical circuits of the seventh embodiment. Here, an example in which a flaw 7200 occurs on part (receiver) of the target circuit in the chip area 7101 is illustrated.

Figure 24:
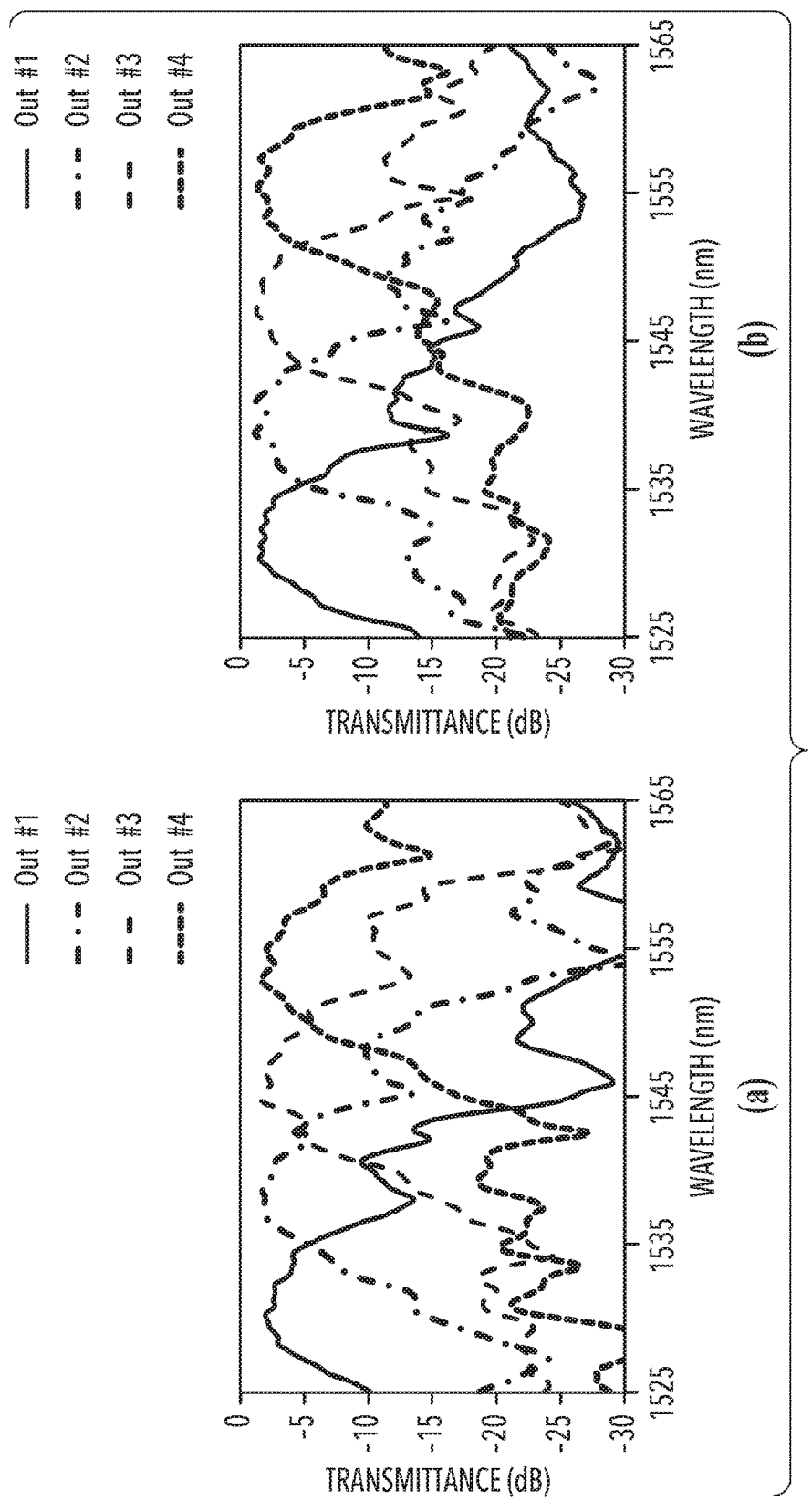
FIG. 24 is a graph showing demultiplexing characteristics of a wavelength multiplex/demultiplex circuit according to the optical circuits of the seventh embodiment.

FIG. 24 is a graph showing demultiplexing characteristics of the wavelength multiplex/demultiplex circuit according to the optical circuits of the seventh embodiment. The respective transmission spectra from an input port to the four output ports are shown. Several optical circuits are considered for implementing a wavelength multiplexing/demultiplexing function, but in the present embodiment, an array waveguide diffraction grating is employed. The array waveguide diffraction grating using a silicon waveguide is disclosed in detail in NPL 1. FIG. 24(*a*) shows transmission spectra for the first wavelength multiplex/demultiplex circuit 7108, and FIG. 24(*b*) shows transmission spectra for the wavelength multiplex/demultiplex circuit 7109. The two wavelength multiplex/demultiplex circuits 7108, 7109 in the optical circuits of the present embodiment have the same design, that is, an interval between multiplexing/demultiplexing wavelengths in design is 8 nm, and a center wavelength of each output port is 1531 nm, 1539 nm, 1547 nm, and 1555 nm. However, due to machining errors and the like at the time of actual manufacturing, a wavelength error of approximately 1 nm at maximum arises between the above-described design value and the actual center wavelength.

In order to achieve detection of a flaw on the optical circuit in the optical circuit of the present invention, an interval between multiplexing/demultiplexing wavelengths for the wavelength multiplex/demultiplex circuits 7108, 7109 is not limited to the above value, and may be set to an arbitrary wavelength value. However, considering the machining error at the time of the above-described manufacturing, it is desirable that an interval between wavelengths be set to larger than 1 nm. Further, it is desirable that the center wavelengths of all the output ports fall within the range of a wavelength region (about 40 nm) whose coupling efficiency between the single pair of grating couplers 7110 and the optical fiber is relatively favorable. Also, the wavelength multiplex/demultiplex circuit used in the present embodiment is not limited only to the array waveguide diffraction grating, but may also be applied to a circuit having a wavelength multiplexing/demultiplexing function such as Mach-Zehnder interferometer circuit (NPL 2) and a ring resonance circuit (NPL 3).

Therefore, the optical circuit of the present embodiment can be carried out as an optical circuit comprising: a plurality of optical waveguides 7104 to 7107, each of which is for one of a plurality of target circuits formed on the substrate, arranged along at least part of a contour of each of the target circuits and arranged proximate at a distance that does not cause optical coupling with each of the target circuits; a first wavelength multiplex/demultiplex circuit 7108 in which one end of each of the plurality of waveguides is connected to each of a plurality of output ends and in which light input to the input end is wavelength multiplexed/demultiplexed to the plurality of output ends; a second wavelength multiplex/demultiplex circuit 7109 in which the other end of each of the plurality of waveguides is connected to each of a plurality of output ends and in which light input to the input end is wavelength multiplexed/demultiplexed to the plurality of output ends, wherein the second wavelength multiplex/demultiplex circuit includes wavelength multiplexing/demultiplexing characteristics identical to those of the first wavelength multiplex/demultiplex circuit, each of the plurality of optical waveguides connected to the respective output ends having the same transmissible wavelength on the two wavelength multiplex/demultiplex circuits; and a pair of grating couplers 7110 connected to the input end of the first wavelength multiplex/demultiplex circuit and the input end of the second wavelength multiplex/demultiplex circuit.

Figure 25:
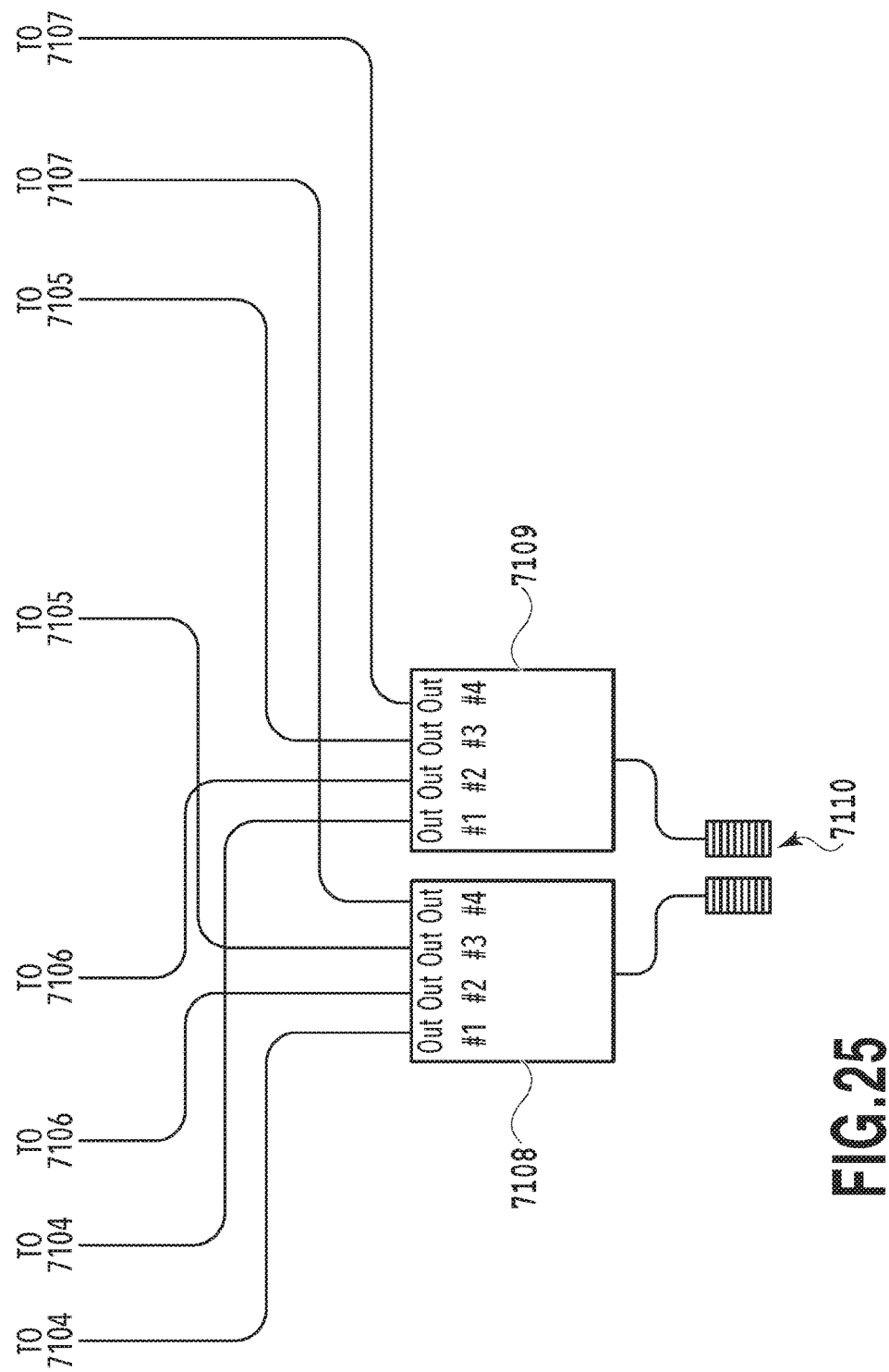
FIG. 25 is a diagram showing the connection relation between two wavelengths multiplex/demultiplex circuits and four optical waveguides for detection according to the optical circuits of the seventh embodiment.

FIG. 25 is a diagram showing the connection relation between two wavelength multiplex/demultiplex circuits and four optical waveguides for detection according to the optical circuits of the seventh embodiment. Both ends of the respective four optical waveguides for detection 7104 to 7107 are connected to respective output ports of the two wavelength multiplex/demultiplex circuits 7108, 7109 which are designed to have the same multiplexed/demultiplexed wavelength. Here, the both ends of the optical waveguide 7104 are connected to first output ports (Out #1) on each of the two wavelength multiplex/demultiplex circuits, the both ends of the optical waveguide 7105 to third output ports (Out #3) on each of the two wavelength multiplex/demultiplex circuits, the both ends of the optical waveguide 7106 to second output ports (Out #2) on each of the two wavelength multiplex/demultiplex circuits, and the both ends of the optical waveguide 7107 to fourth output ports (Out #4) on each of the two wavelength multiplex/demultiplex circuits. In addition, one input to the first wavelength multiplex/demultiplex circuit 7108 and one input to the second wavelength multiplex/demultiplex circuit 7109 are connected to the pair of grating couplers 7110, respectively.

Several waveguide crossings occur among the optical waveguides in FIG. 25, and it is desirable that a waveguide crossing structure of a low loss be applied to these crossings. As there are many publicly-known proposals on the low-loss waveguide crossing structures, the structure represented in NPL 4, for example, may be employed.

In the optical circuits of the present embodiment, in an inspection during the manufacturing process for detecting a flaw occurred on a target circuit, a transmission spectrum is measured via the pair of grating couplers 7110 configured on a wafer by using the optical probe. The test lights are supplied to the four optical waveguides for detection via the two wavelength multiplex/demultiplex circuits to measure transmission spectra.

Figure 26:
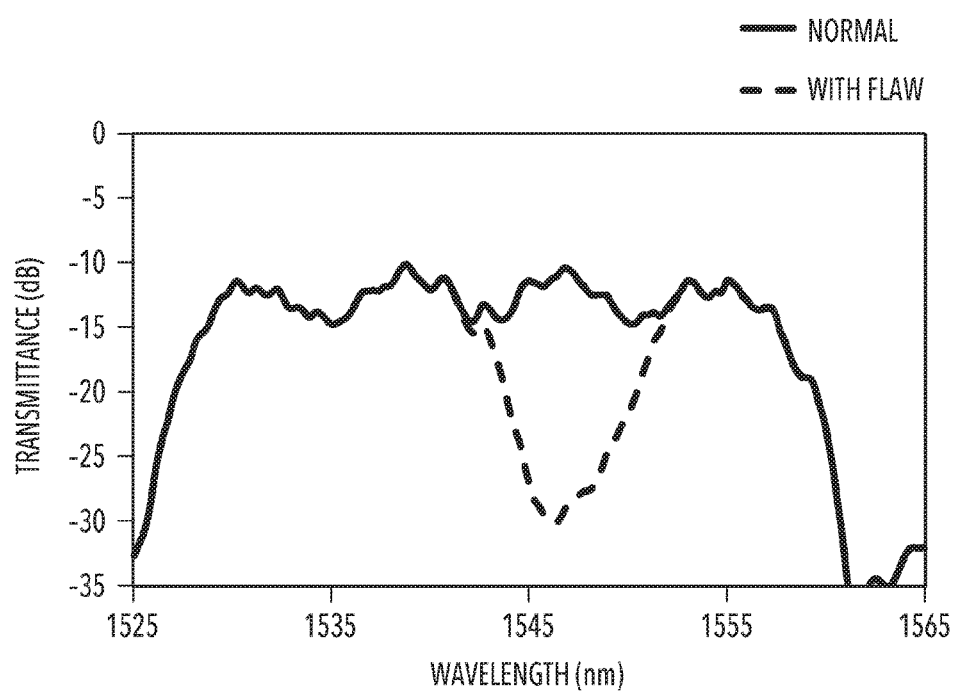
FIG. 26 is a graph showing transmission spectra obtained in cases with/without a flaw according to the optical circuits of the seventh embodiment.

FIG. 26 is a graph showing transmission spectra obtained in cases with/without a flaw according to the optical circuits of the seventh embodiment. In a case where a flaw occurs on any of the four target circuits, among the optical waveguides 7104 to 7107, a flaw (defect) occurred on the corresponding optical waveguide causes a great loss, and thus, such a loss is reflected on the corresponding wavelength region of the transmission spectrum. As shown in FIG. 23, in the case where the flaw 7200 occurs on the target circuit (receiver) in the chip area 7101, a loss arises on the optical waveguide 7105. Accordingly, the loss caused by the flaw is reflected on a spectrum in the vicinity of the wavelength of 1547 nm corresponding to the third output ports (Out #3) on each of the wavelength multiplex/demultiplex circuits 7108, 7109 to which the optical waveguide 7105 is connected, and in FIG. 26, a transmission spectrum indicated with a dotted line representing "with flaw" is obtained. Meanwhile, in a case where no flaw exists on any of the four target circuits, a transmission spectrum having the same loss level for all the wavelengths corresponding to the respective four output ports is obtained as indicated with a solid line representing "normal" in FIG. 26.

Figure 29A:
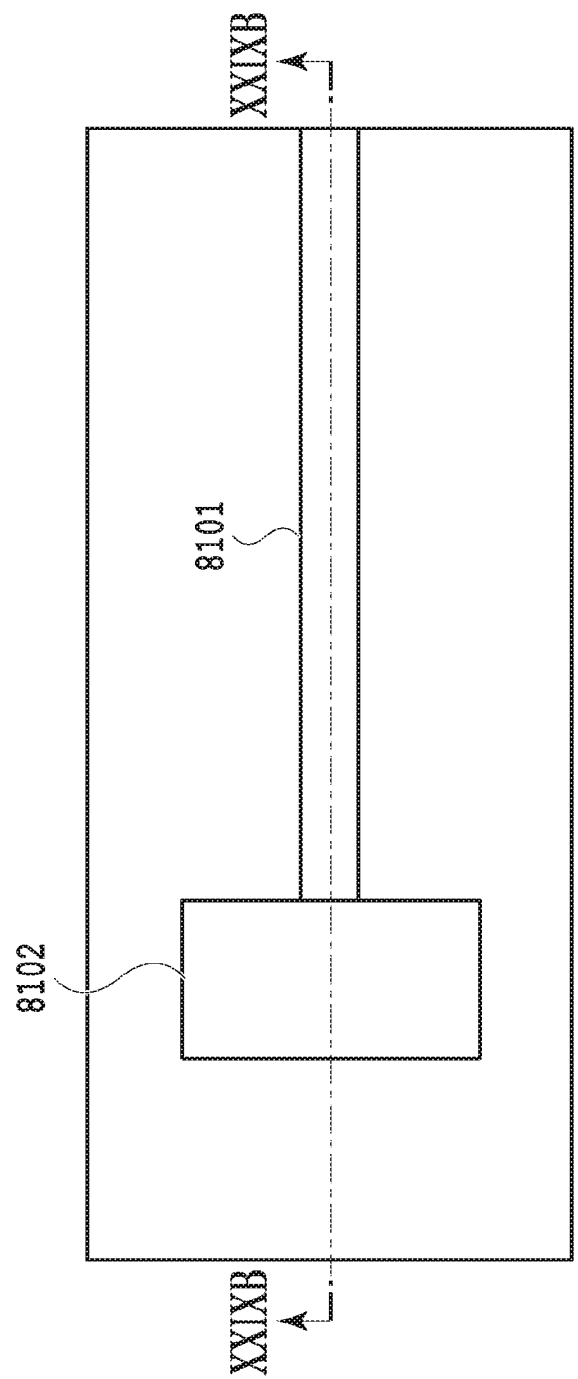
FIG. 29A is a top view showing another configuration example of optical path conversion means according to the optical circuit of the present invention.
Figure 29B:
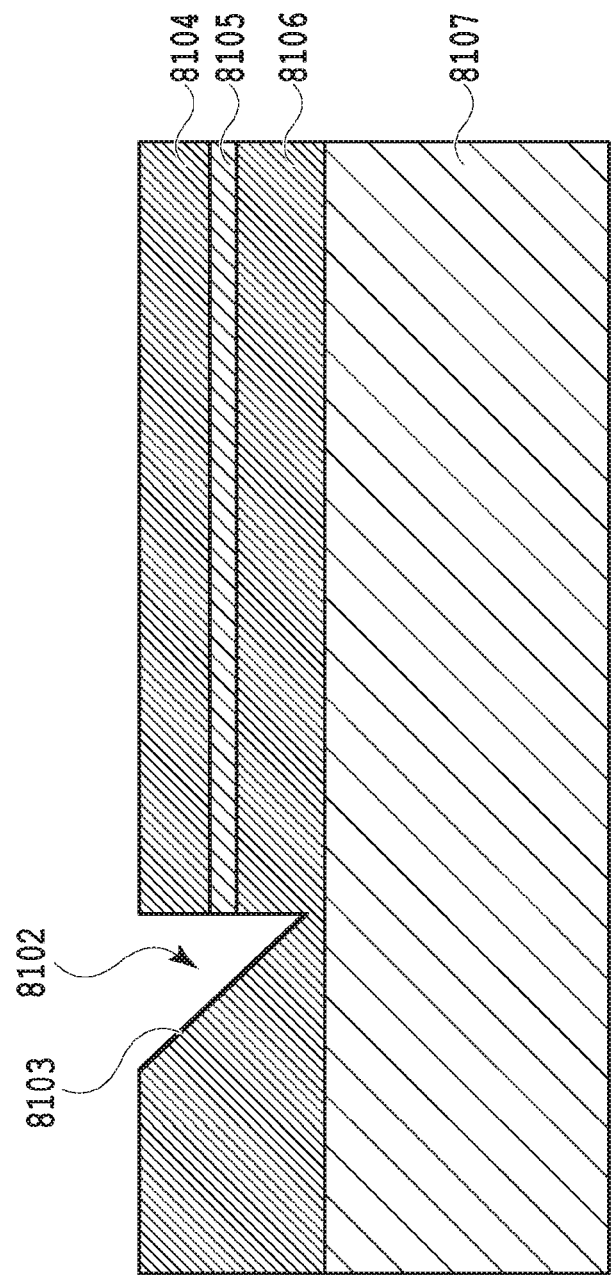
FIG. 29B is a sectional view showing another configuration example of the optical path conversion means according to the optical circuit of the present invention.

FIG. 29A and FIG. 29B are diagrams showing another implementing example of optical path conversion means in the present invention. Optical conversion means can also be realized by an optical circuit other than the grating couplers. FIG. 29A is a plan view viewing the substrate face of the optical path conversion circuit. FIG. 29B is a diagram showing a cross section that has been cut vertically to the substrate face along the optical waveguide including XXIXB-XXIXB line in FIG. 29A. In this embodiment, the silicon optical circuit is to be shown as an example of implementing optical path conversion means, but it is possible to implement the optical path conversion means of approximately the same structure even with optical circuits made of other material systems. With reference to FIG. 29A, the optical path conversion circuit is configured at the end part of a waveguide core portion 8101 which is part of the optical waveguide for detection and which is formed of silicon. The waveguide core portion 8101 corresponds to an optical waveguide 8105 in the sectional view of FIG. 29B. With reference to FIG. 29B, in the vicinity of the optical path conversion circuit, a BOX layer (lower part cladding) 8106 and further an upper part cladding 8104 made of SiO2 are formed above a silicon substrate part 8107 of a SOI substrate. The waveguide core portion 8105 has a thickness of 0.22 μm and a width of 0.5 μm, the upper part cladding 8104 has a thickness of about 2 μm, and the lower part cladding 8106 has a thickness of 2 μm.

The optical path conversion circuit of FIG. 29A includes a groove portion 8102 formed by machining the upper part cladding 8104, the waveguide core portion 8105, and the lower part cladding 8106. The groove portion 8102 has two end faces which are vertical to the optical waveguide 8105. Meanwhile, an end face terminating one end face of the waveguide core 8105 is formed nearly vertical to the silicon substrate 8107. Another end face 8103 facing the terminating face is a total reflection face against light, and is formed with an angle of about 45 degrees relative to the silicon substrate 8107. The end face 8103 having the total reflection face may be made of a material used for the upper part cladding and lower part cladding, that is, the face made of SiO2, but may alternatively be formed of a metal film or the like on a surface in order to obtain higher reflection efficiency.

Here, a lightwave propagating through the optical waveguide 9105 from the right side to the left side in FIG. 29B is emitted into a free space in the groove portion 8102, and, before long, reaches the total reflection face 8103, whereby its advancing direction is converted nearly upward in FIG. 29B. Similarly, light input from the upper part of FIG. 29B advances along a route opposite of the above route to couple with the optical waveguide 9105 to be propagated toward the right side of FIG. 29B. This optical path conversion circuit enables light connection with input/output means such as the optical fiber disposed at upper part of the groove portion 8102 in FIG. 29B. Therefore, the optical path conversion circuit composed of the groove portion 8102 including the terminating face of the optical waveguide and the total reflection face which faces the terminating face and which reflects light emitted from the terminating face substantially vertically relative to the SOI substrate functions as a coupler that couples entering/outgoing light with the optical fiber. At both ends of the optical waveguide for detection in each of the above embodiments, the optical path conversion circuit illustrated in FIG. 29A and FIG. 29B can be provided. The above-described pair of grating couplers are replaceable with the pair of couplers using the optical path conversion circuit illustrated in FIG. 29A and FIG. 29B.

In the optical circuits of the present embodiment of the present invention, the presence/absence of a flaw in each of the four target circuits can be simultaneously judged by one measurement. Therefore, as in the above first to fifth embodiments, the number of measurements are reduced by approximately one quarter and the inspection time can be reduced when compared with the case of flaw detection measurement by measuring the individual optical waveguide corresponding to each of all the target circuits, thereby achieving enhanced efficiency. Further, when compared with the optical circuits of the sixth embodiment, the efficiency of the inspection is superior in that the coupling between the grating couplers and the optical probe is only required to be made on one location and that a target circuit with a flaw can be specified by only one measurement.

In the above explanation of the present embodiment, the four optical waveguides for detection 7104 to 7107 are arranged in the corresponding four chip areas, and are merged into the two wavelength multiplex/demultiplex circuits 7108, 7109. However, the number of optical waveguides for detection to be merged into the two wavelength multiplex/demultiplex circuits 7108, 7109, that is, the number of target circuits (chip areas) for flaw detection can be appropriately changed according to the scale of an optical circuit within one chip or the size of one chip. Therefore, if the number of optical waveguides for detection to be merged into the two wavelength multiplex/demultiplex circuits 7108, 7109 can be increased, the number of target circuits for detecting a flaw only by one measurement can be increased. In this case, by narrowing a wavelength interval within a range in which loss difference can be identified and by increasing the number of ports of the wavelength multiplex/demultiplex circuits, the number of target circuits for discovering a flaw only by one measurement can be increased. If the manufacturing process has less frequency of flaw occurrence and has relatively less deficiency, in inverse proportion to the number of optical waveguides for detection (chip regions) to be merged into the two wavelength multiplex/demultiplex circuits 7108, 7109, the number of whole measurements in one wafer can be reduced.

As described above, according to the present embodiment, a flaw occurred in the manufacturing process of the silicon optical circuits on a wafer can be objectively detected in an earlier stage in the inspection in the state of a wafer.

As such, explanations have been given in detail that, according to the optical circuits of seven embodiments of the present invention, the silicon optical circuit for inspection during the process of the present invention allows objective detection with higher detection accuracy of a flaw occurred in the manufacturing process of the optical circuit on a wafer compared to the visual inspection of a conventional technique.

Explanations have been given that, in the first embodiment to fourth embodiment, the optical modulation circuit of a digital coherent polarization multiplexed system is employed for a target circuit for detecting a flaw, and in the fifth embodiment to seventh embodiment, the optical modulation circuit and optical reception circuit are employed as the integrated circuit, but the present invention is not limited to those target circuits, and may be applied to all optical circuits that are composed of silicon optical waveguides.

In all the embodiments, explanations have been given by using configuration examples such that the upper part cladding and the lower part cladding are made of quartz and that a specific value is employed for a thickness, but the optical circuit of the present invention is not limited to these examples. A material having a lower refractive index than silicon is applicable to the cladding, and a thickness of each cladding may sufficiently exceed the range of light that slightly seeps out of the core, failing to be accommodated in the core. Alternatively, it is also possible to clad air as the upper part cladding instead of filling the core with a specific material.

Furthermore, in all the embodiments described above, the design parameters of the grating couplers have been explained to have specific values, but the optical circuit of the present invention is not limited to these examples, and may be applied to the grating couplers of any design. Moreover, in the embodiments of the present invention, an example of the design of operating in a so-called C band (the wavelength of approximately 1525 nm to 1565 nm) with high efficiency has been presented, and it is desirable that the appropriate design of grating couplers be applied in accordance with the use of, for example, wavelengths for operating an optical circuit.

As described above, according to the optical circuit of the present invention, a flaw occurred in the manufacturing process of the silicon optical circuit on a wafer can be objectively detected by inspection in the state of a wafer.

Further, according to the present invention, a flaw occurred in the manufacturing process of the silicon optical circuits can be detected with high accuracy in an earlier stage of the manufacturing process and can efficiently prevent a circuit including failure which has been overlooked in inspection in the state of a wafer from flowing out to subsequent processes. The manufacturing time and cost for products that employ silicon optical circuits can be reduced.

INDUSTRIAL APPLICABILITY

The present invention can be used for a communication system in general. In particular, the present invention can be used for a silicon optical circuit of an optical communication system.

The invention claimed is:

1. A silicon optical circuit having a function of detecting a flaw occurred on an optical circuit element formed on a substrate, the optical circuit comprising:
   an optical waveguide arranged along at least a part of a contour of a target circuit having a predetermined function by the optical circuit element and arranged proximate at a distance that does not cause optical coupling with the target circuit; and
   optical path conversion means disposed at both ends of the optical waveguide.

2. The optical circuit according to claim 1, wherein the optical path conversion means is either of:
   a pair of grating couplers; or
   a pair of couplers composed of two optical path conversion circuits each having a terminating face of the optical waveguide and a total reflection face which faces the terminating face and which reflects light emitted from the terminating face substantially vertically relative to an SOI substrate.

3. The optical circuit according to claim 1, wherein the target circuit, the optical waveguide, and the optical path conversion means are composed of a silicon fine wire formed on the SOI substrate.

4. The optical circuit according to claim 1, wherein at least part of a linear portion of the optical waveguide is a multimode waveguide whose core width has been enlarged, and the multimode waveguide is connected to a waveguide of another portion of the optical waveguide via a tapered waveguide without mode conversion.

5. The optical circuit according to claim 1, wherein the optical waveguide does not cross the target circuit and a portion of the optical waveguide along a contour of the target circuit is arranged so as to keep a distance of 50 µm or less from the contour.

6. The optical circuit according to claim 1, wherein
   the optical waveguide includes an outward portion arranged along a contour of the target circuit from one coupler of the optical path conversion means so as to substantially surround the target circuit and a return portion arranged by returning substantially parallel to the outward portion to reach the other coupler of the optical path conversion means, and
   the couplers of the optical path conversion means are formed proximate and parallel to each other such that their incident angles face the same direction at the time of coupling to fiber components and an arrangement interval therebetween is 1 mm or less.

7. The optical circuit according to claim 1, wherein the target circuit includes at least two sub target circuits having an identical function or different functions, the optical waveguide at least includes:
   a loopback waveguide portion having an outward portion arranged along a contour of a first sub target circuit from one coupler of the optical path conversion means so as to surround the first sub target circuit and a return portion arranged by returning substantially parallel to the outward portion; and
   a waveguide portion between the sub target circuits arranged continuously from the loopback waveguide portion of the first sub target circuit along part of a contour that is not surrounded by the loopback waveguide portion of the contour of the first sub target circuit or along at least part of a contour of a second sub target circuit that is different from the first sub target circuit, and
   the couplers of the optical path conversion means are formed proximate and parallel to each other such that their incident angles face the same direction at the time of coupling to fiber components and an arrangement interval therebetween is 1 mm or less.

8. The optical circuit according to claim 1, the optical circuit comprising:
   a plurality of optical waveguides, each of which is for one of a plurality of target circuits formed on the substrate and arranged along at least part of a contour of each of the target circuits and arranged proximate at a distance that does not cause optical coupling with each of the target circuits;
   a plurality of corresponding optical path conversion means connected to the plurality of optical waveguides, respectively;
   a common single optical waveguide which is arranged proximate to each of the plurality of target circuits and each of the optical waveguides corresponding thereto and which is configured to be parallel to each of the plurality of optical waveguides extending over all of the plurality of target circuits; and
   common optical path conversion means connected to the common single optical waveguide.

9. The optical circuit according to claim 1, the optical circuit comprising:
   a plurality of optical waveguides, each of which is for one of a plurality of target circuits formed on the substrate and arranged along at least part of a contour of each of the target circuits and arranged proximate at a distance that does not cause optical coupling with each of the target circuits;
   a first wavelength multiplex/demultiplex circuit in which one end of each of the plurality of waveguides is connected to each of a plurality of output ends and in which light input to the input end is wavelength multiplexed/demultiplexed to the plurality of output ends;
   a second wavelength multiplex/demultiplex circuit in which the other end of each of the plurality of waveguides is connected to each of a plurality of output ends and in which light input to the input end is wavelength multiplexed/demultiplexed to the plurality of output ends, wherein the second wavelength multiplex/demultiplex circuit includes wavelength multiplexing/demultiplexing characteristics identical to those of the first wavelength multiplex/demultiplex circuit, each of the plurality of optical waveguides connected to the respective output ends having the same transmissible wavelength on the two wavelength multiplex/demultiplex circuits; and optical path conversion means connected to the input end of the first wavelength multiplex/demultiplex circuit and the input end of the second wavelength multiplex/demultiplex circuit.

\* \* \* \* \*